(12) United States Patent
Yano

(10) Patent No.: US 11,187,898 B2
(45) Date of Patent: Nov. 30, 2021

(54) IMAGE DISPLAY APPARATUS

(71) Applicant: SONY CORPORATION, Tokyo (JP)

(72) Inventor: Tomoya Yano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/753,171

(22) PCT Filed: Aug. 17, 2018

(86) PCT No.: PCT/JP2018/030523
§ 371 (c)(1),
(2) Date: Apr. 2, 2020

(87) PCT Pub. No.: WO2019/073688
PCT Pub. Date: Apr. 18, 2019

(65) Prior Publication Data
US 2020/0301135 A1    Sep. 24, 2020

(30) Foreign Application Priority Data

Oct. 11, 2017  (JP) .............................. JP2017-197363

(51) Int. Cl.
*G02B 27/01* (2006.01)
*H04N 13/383* (2018.01)
*H04N 13/344* (2018.01)

(52) U.S. Cl.
CPC ....... *G02B 27/0101* (2013.01); *H04N 13/344* (2018.05); *H04N 13/383* (2018.05);
(Continued)

(58) Field of Classification Search
CPC ........ G02B 27/017; G02B 27/01–0101; G02B 27/103; G02B 27/1066; G02B 27/145;
(Continued)

(56) References Cited

U.S. PATENT DOCUMENTS

| 5,572,343 A | 11/1996 | Okamura et al. |
| 2008/0048932 A1 | 2/2008 | Yanagisawa |

(Continued)

FOREIGN PATENT DOCUMENTS

| JP | 05-328260 A | 12/1993 |
| JP | 09-054276 A | 2/1997 |

(Continued)

OTHER PUBLICATIONS

International Search Report and Written Opinion of PCT Application No. PCT/JP2018/030523, dated Oct. 16, 2018, 12 pages of ISRWO.

*Primary Examiner* — Xuemei Zheng
(74) *Attorney, Agent, or Firm* — Chip Law Group

(57) ABSTRACT

An image display apparatus according to an embodiment of the present technology includes a display surface, an image display section, an acquisition section, and a light-shielding section. The display surface has transparency. The image display section displays a display image on the display surface. The acquisition section acquires eye information regarding an eye of a user. The light-shielding section forms, according to the acquired eye information and information regarding the display image, a light-shielding region in a region corresponding to a display region of the display image. This makes it possible to improve the visibility of the display image.

19 Claims, 12 Drawing Sheets

(52) U.S. Cl.
CPC ............... *G02B 2027/0118* (2013.01); *G02B 2027/0138* (2013.01)

(58) Field of Classification Search
CPC .... G02B 2027/0118; G02B 2027/0174; G02B 2027/014; G02B 2027/0141; G02B 2027/0134; G02B 2027/0198; G02B 2027/0103; G02B 2027/0129; G02B 27/0101; G02B 2027/138; H04N 13/383; H04N 13/344; H04N 13/363; H04N 13/31; H04N 13/302; H04N 13/351; H04N 13/341; G06T 19/006; G06T 19/20
See application file for complete search history.

(56) References Cited

U.S. PATENT DOCUMENTS

| | | | | |
|---|---|---|---|---|
| 2015/0370071 A1* | 12/2015 | Alton | ............... | G02B 27/0101 349/11 |
| 2016/0187650 A1* | 6/2016 | Mills | ............... | A42B 3/226 345/8 |
| 2017/0154464 A1* | 6/2017 | Lanier | ............... | G06T 19/006 |
| 2017/0323615 A1* | 11/2017 | Hazra | ............... | G09G 3/002 |
| 2019/0373249 A1* | 12/2019 | Kato | ............... | B60K 35/00 |

FOREIGN PATENT DOCUMENTS

| | | | |
|---|---|---|---|
| JP | 2001-337353 A | 12/2001 | |
| JP | 2003-121944 A | 4/2003 | |
| JP | 2008-083510 A | 4/2008 | |
| JP | 2014-228595 A | 12/2014 | |
| WO | 2005/124431 A1 | 12/2005 | |
| WO | 2013/128573 A1 | 9/2013 | |
| WO | WO-2013128573 A1 * | 9/2013 | ............ G02B 27/01 |

* cited by examiner

IMAGE DISPLAY APPARATUS

CROSS REFERENCE TO RELATED APPLICATIONS

This application is a U.S. National Phase of International Patent Application No. PCT/JP2018/030523 filed on Aug. 17, 2018, which claims priority benefit of Japanese Patent Application No. JP 2017-197363 filed in the Japan Patent Office on Oct. 11, 2017. Each of the above-referenced applications is hereby incorporated herein by reference in its entirety.

TECHNICAL FIELD

The present technology relates to an image display apparatus that displays an image using, for example, a transparent screen.

BACKGROUND ART

In the past, a technology has been developed that projects image light onto, for example, a transparent screen and displays an image on the transparent screen. For example, by projecting image light on a transparent screen through which a background and the like can be seen, it is possible to display an image such that the image overlaps the background.

Patent Literature 1 discloses a hologram screen that is capable of displaying an image in a state in which a background can be seen through the hologram screen. In Patent Literature 1, the hologram screen scatters, diffuses, and emits video light incident from a video projection apparatus. This makes it possible to provide an observer with a video displayed on the hologram screen together with an object installed behind the hologram screen (For example, paragraphs [0002], [0045], and [0046] of the specification and FIG. 1 in Patent Literature 1).

Patent Literature 2 discloses a display apparatus that includes a first display panel and a second display panel, the first display panel being transparent and displays thereon, for example, an image and letters, the second display panel being provided on a back side of the first display screen and being capable of controlling the transmittance. When an image or the like is displayed on the first display panel, an entire region or a region depending on the position of the image is set to a light-shielding state by the second display panel. This makes it possible to improve the visibility of a displayed content (For example, paragraphs [0039] to [0043] of the specification and FIGS. 2 to 5 in Patent Literature 2).

CITATION LIST

Patent Literature

Patent Literature 1: Japanese Patent Application Laid-open No. 2003-121944
Patent Literature 2: Japanese Patent Application Laid-open No. 2008-83510

DISCLOSURE OF INVENTION

Technical Problem

A technology that displays an image using, for example, a transparent screen is expected to be applied to various fields such as amusement, advertisement, and healthcare, and a technology has been desired that makes it possible to improve the visibility of an image.

In view of the circumstances described above, it is an object of the present technology to provide an image display apparatus that makes it possible to improve the visibility of a display image.

Solution to Problem

In order to achieve the object described above, an image display apparatus according to an embodiment of the present technology includes a display surface, an image display section, an acquisition section, and a light-shielding section.

The display surface has transparency.

The image display section displays a display image on the display surface.

The acquisition section acquires eye information regarding an eye of a user.

The light-shielding section forms, according to the acquired eye information and information regarding the display image, a light-shielding region in a region corresponding to a display region of the display image.

In the image display apparatus, according to eye information regarding an eye of a user, a light-shielding region is formed in a region corresponding to a display region of a display image. This makes it possible to improve the visibility of the display image.

The light-shielding section may include a light-shielding surface that is arranged on a side opposite to a side of the eye of the user with respect to the display surface and is capable of controlling light transmittance.

The light-shielding section may include a light-shielding surface that is capable of controlling light transmittance, and may form a light-shielding region having a shape substantially analogous to a shape of the display image.

The light-shielding section may include a light-shielding surface that is capable of controlling light transmittance, and may form the light-shielding region in a region that is formed by projecting an edge of the display image onto the light-shielding surface from a position of the eye of the user.

The display surface may be a surface of a transparent screen. In this case, the light-shielding surface may be a surface of a light-shielding layer arranged to be spaced from the transparent screen.

The display surface may be a surface of a transparent screen. In this case, the light-shielding surface may be a surface of a light-shielding layer arranged on the transparent screen in a layered formation.

The display surface may be a surface of a transparent screen provided as a portion of a cylindrical shape. In this case, the light-shielding surface may be a surface of a light-shielding layer provided as another portion of the cylindrical shape.

The display surface may be a surface of a transparent screen provided in a cylindrical shape. In this case, the light-shielding surface may be a surface of a light-shielding layer arranged on an inner peripheral side of the display surface in a layered formation.

The image display section may include an image emission section that emits image light making up the display image. In this case, the display surface may be a reflective surface of a reflective member that has transparency and is arranged on an emission side of the image emission section, the reflective surface being a reflective surface off which at least a portion of the image light is reflected. Further, the light-shielding surface may be arranged on a side opposite to a side of the eye of the user with respect to the reflective member.

The light-shielding section may include a light-shielding surface that is capable of controlling light transmittance according to irradiation of light of a specified wavelength, and an emission section that emits the light of the specified wavelength.

The light-shielding section may include a light-shielding surface that is capable of controlling light transmittance according to a change in temperature, and a temperature control section that controls a temperature of the light-shielding surface.

The light-shielding section may include a liquid crystal layer that is capable of controlling light transmittance.

The light-shielding section may increase light transmittance around an edge of the light-shielding region in a direction outward from the light-shielding region.

The display surface may be configured such that the light of the specified wavelength is able to be transmitted through the display surface.

The image display section may include an image emission section that emits image light making up the display image. In this case, the image emission section may be capable of emitting the light of the specified wavelength and may serve as the light-shielding section.

The image display section may individually display, on the display surface, a left-eye image and a right-eye image that are used to create a three-dimensional image. In this case, the light-shielding section may form the light-shielding region in a region corresponding to a display region of the left-eye image, and the light-shielding region in a region corresponding to a display region of the right-eye image.

The image display section may display each of the left-eye image and the right-eye image such that a position of the display region of the left-eye image and a position of the display region of the right-eye image substantially coincide with each other.

The display surface may be a surface of a hologram screen.

The image display section may display the display image according to the acquired eye information.

The acquisition section may include an image-capturing section, and an image analyzer that generates the eye information according to an image of the user that is captured using the image-capturing section.

Advantageous Effects of Invention

As described above, the present technology makes it possible to improve the visibility of a display image. Note that the effect described here is not necessarily limitative and may be any effect described in the present disclosure.

MODE(S) FOR CARRYING OUT THE INVENTION

Embodiments according to the present technology will now be described below with reference to the drawings.

First Embodiment

[Configuration of Image Display Apparatus]

Figure 1:
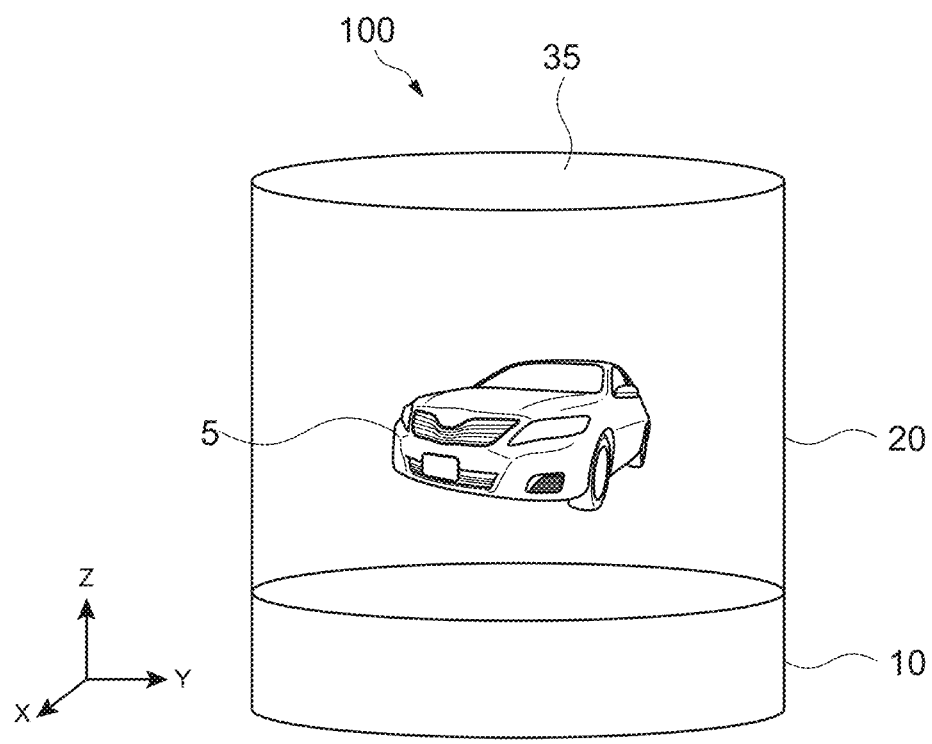
FIG. 1 schematically illustrates an appearance of an image display apparatus according to a first embodiment.

FIG. 1 schematically illustrates an appearance of an image display apparatus according to a first embodiment of the present technology. In the following descriptions, for convenience, a front-rear direction of an image display apparatus 100 is referred to as an X direction, and a left-right direction of the image display apparatus 100 is referred to as a Y direction. Further, an up-down direction of the image display apparatus 100 is referred to as a Z direction.

The entirety of the image display apparatus 100 has a substantially columnar shape, and includes a base 10, a cylindrical surface 20 having a cylindrical shape and having transparency, and a transparent top surface 35 having a circular shape and having transparency.

In the present disclosure, having transparency includes both a state of being transparent and a state of being semi-transparent, in which a state of being colored is also included. For example, when the back of a member can be seen through the member, the member can be considered a member having transparency. Further, a member through which at least a portion of visible light can be transmitted is also included in the member having transparency.

In the present embodiment, the cylindrical surface 20 is a transparent surface, and the back (the rear side) of the cylindrical surface 20 as viewed from a user can be seen through the cylindrical surface 20 when an image is not displayed on the cylindrical surface 20. As illustrated in FIG.

1, when an image 5 is displayed on the cylindrical surface 20, the image 5 is displayed in a state of being suspended in air in a space above the base 10, that is, in a space inside the cylindrical surface 20, and an excellent visual effect is achieved.

Figure 2:
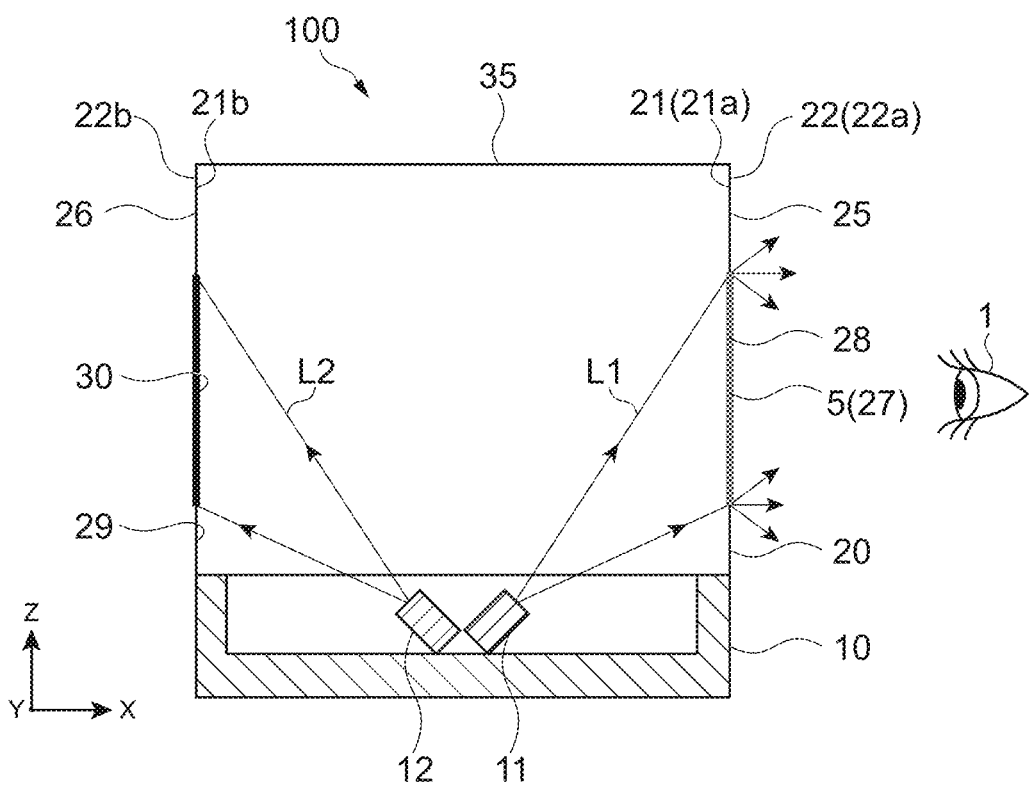
FIG. 2 schematically illustrates a cross section along an XZ plane passing through the center of the image display apparatus.
Figure 3:
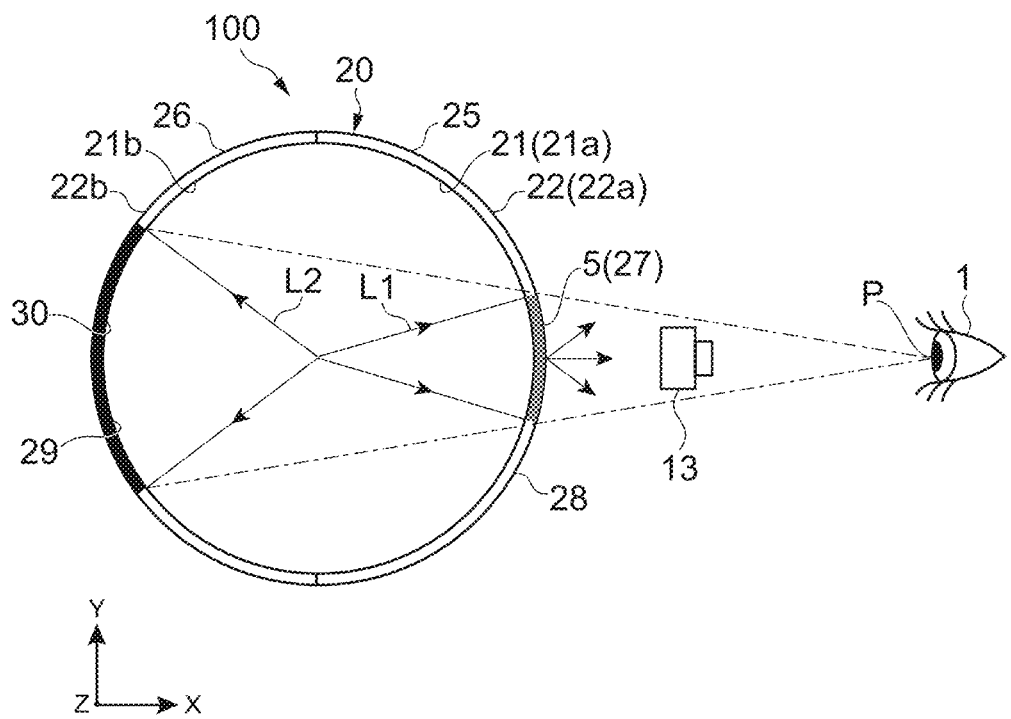
FIG. 3 is a schematic diagram primarily illustrating a cylindrical surface of the image display apparatus as viewed from above.

FIG. 2 schematically illustrates a cross section along an XZ plane passing through the center of the image display apparatus 100. FIG. 3 is a schematic diagram primarily illustrating the cylindrical surface 20 of the image display apparatus 100 as viewed from above.

The base 10 is provided to a lower portion of the image display apparatus 100, and supports the cylindrical surface 20 around a full 360 degrees. A projector 11, an ultraviolet (UV) projector 12, a controller 15 (refer to FIG. 4), and a storage 14 (refer to FIG. 4) are installed inside the base 10. Further, for example, a power supply source such as a battery, a speaker, and other elements necessary for an operation of the image display apparatus 100 (that are not illustrated) are provided inside the base 10 as appropriate.

The projector 11 is installed at approximately the center of the base 10 to be oriented toward the front side. Image light L1 that makes up the image 5 is emitted from the projector 11, and is projected onto an inner periphery 21 of the cylindrical surface 20. This results in displaying the image 5 on an outer periphery 22 of the cylindrical surface 20.

As illustrated in FIG. 3, in the present embodiment, the image light L1 is emitted to an inner periphery (hereinafter simply referred to as a front-side inner periphery) 21a of a portion corresponding to a semi-circular portion on the front side of the cylindrical surface 20. Thus, as viewed from a user 1, the image 5 is displayed on an outer periphery (hereinafter simply referred to as a front-side outer periphery) 22a of the portion corresponding to the semi-circular portion on the front side of the cylindrical surface 20.

The projector 11 is capable of changing a projection position of the image light L1 with respect to the front-side inner periphery 21a. In other words, the projector 11 is capable of changing an emission direction of the image light L1. When the projection position of the image light L1 is changed, a display position of the image 5 displayed on the front-side outer periphery 22a is also changed according to the change in the projection position of the image light L1. The method for changing an emission direction of the image light L1 is not limited, and a projection optical system of the projector 11 may be controlled, or the projector 11 itself may be capable of changing its orientation.

A specific configuration of the projector 11 is not limited, and, for example, a laser-scanning color projector is used that scans pieces of laser light respectively corresponding to colors of R, G, and B to display each pixel. Further, for example, a small mobile projector (pico projector) or a projector using monochromatic laser light may be used as appropriate according to, for example, the size or the use of the image display apparatus 100. Moreover, any projector that is capable of projecting image light may be used.

The UV projector 12 is installed at approximately the center of the base 10 to be oriented toward the rear side. Ultraviolet light (UV light) L2 is emitted from the UV projector 12 to a rear-side inner periphery 21b of the cylindrical surface 20. The UV projector 12 is capable of changing an emission direction of the UV light. A specific configuration of the UV projector 12 is not limited, and the UV projector 12 may be designed discretionarily. In the present embodiment, the UV light L2 corresponds to light of a specified wavelength, and a numerical value of a specific wavelength is set as appropriate such that a light-shielding region described later can be formed.

The cylindrical surface 20 includes a transparent screen 25 and a light-shielding layer 26. The transparent screen 25 is provided on the front side of the cylindrical surface 20, that is, in the portion corresponding to the semi-circular portion on the front side, as illustrated in FIG. 3. In other words, the transparent screen 25 is provided as a portion of the cylindrical shape.

An inner periphery of the transparent screen 25 corresponds to the front-side inner periphery 21a, and is a projection-target region onto which the image 5 is projected. An outer periphery of the transparent screen 25 corresponds to the front-side outer periphery 22a, and is a display-target region on which the image 5 is displayed. In the following descriptions, the front-side inner periphery 21a may also be referred to as the inner periphery 21a of the transparent screen 25. Further, the front-side outer periphery 22b may also be referred to as the outer periphery 22a of the transparent screen 25.

On the inner periphery 21a of the transparent screen 25, a region in which the image 5 is created by the image light L1 being projected onto the region (a region irradiated with the image light L1), is an irradiation region of the image light L1. On the outer periphery 22a of the transparent screen 25, a region on which the image 5 is displayed is a display region 27 of the image 5. In the present embodiment, the outer periphery 22a that is a surface on the outer peripheral side of the transparent screen 25 constitutes a display surface 28 having transparency. The image 5 displayed on the display surface 28 corresponds to a display image.

In the present embodiment, a hologram screen that is formed of a transmissive hologram is used as the transparent screen 25. For example, the transmissive hologram records therein an interference pattern of light diffused by a diffusion plate, and includes a diffusion function that diffuses the incident image light L1. The configuration is not limited to this, and, for example, a light diffusion layer or the like that diffuses image light may be arranged, in a layered formation, on the side of an outer periphery of a transmissive hologram that does not include a diffusion function.

As schematically illustrated in FIG. 2, the image light L1 having entered the hologram screen from the inside of the hologram screen is diffused (scattered) by the hologram screen in various directions to be emitted to the outside. For example, the hologram screen is designed such that light emitted in a direction vertical to the hologram screen (the X direction) exhibits a maximum gain with respect to the image light L1 emitted from below. This makes it possible to provide a high-quality image having a high level of visibility to the user 1 who is looking at the image 5 from a position in a direction substantially horizontal to the image display apparatus 100. Of course, the design is not limited to such a design.

The nature or the like of a transmissive hologram forming a hologram screen is not limited, and, for example, any photosensitive material may be used. Further, any holographic optical element (HOE) that serves as a transmissive hologram may be used as appropriate. Furthermore, the method for producing a hologram screen by performing exposure to light is also not limited, and may be set discretionarily with respect to, for example, the wavelength and the emission direction of object light or reference light.

For example, a screen or the like that diffuses light using, for example, a scatterer such as microparticles, a Fresnel lens, or a microlens may be used as the transparent screen 25. Further, the transparent screen 25 may be formed of a transparent display such as a transparent OELD using organic electro-luminescence (organic EL, OEL). Furthermore, for example, any film or coating that is capable of diffusing the image light L1 may be used as the transparent screen 25. Moreover, any technology for producing a display surface having transparency may be used.

The light-shielding layer 26 is provided on the rear side of the cylindrical surface 20, that is, in a portion corresponding to a semi-circular portion on the rear side, as illustrated in FIG. 3. Thus, the light-shielding layer 26 is provided as the other portion of the cylindrical shape. An inner periphery of the light-shielding layer 26 corresponds to the rear-side inner periphery 21b, and is an irradiation-target region that is irradiated with the UV light L2. In the following descriptions, the rear-side inner periphery 21b may also be referred to as the inner periphery 21b of the light-shielding layer 26.

In the present embodiment, a photochromic layer made of photochromic material is provided as the light-shielding layer 26. Light of a wavelength of a visible-light band is transmitted through the light-shielding layer 26, and the light-shielding layer 26 turns black according to the irradiation of the UV light L2 emitted from the UV projector 12. Thus, the color of an irradiation region irradiated with the UV light L2 is changed to black, and the light transmittance is regulated.

The method for forming the light-shielding layer 26 is not limited. For example, the surface of a transparent member is coated with photochromic material to form the light-shielding layer 26. Alternatively, the light-shielding layer 26 may be formed by processing a member including a photochromic function. Further, a specific nature of photochromic material is also not limited, and the photochromic material may be selected as appropriate so that a desired light transmittance can be achieved. Furthermore, the color produced according to the irradiation of the UV light L2 is also not limited to black.

In the present embodiment, the inner periphery 21b that is a surface on the inner peripheral side of the light-shielding layer 26 constitutes a light-shielding surface 29 that is capable of controlling the light transmittance. The light-shielding surface 29 is arranged on a side opposite to a side of an eye of the user 1 with respect to the display surface 28.

An irradiation region on the light-shielding surface 29 that turns black according to the irradiation of the UV light L2 is a light-shielding region 30. The light-shielding region 30 is not limited to exhibiting light transmittance of nearly zero according to the irradiation of the UV light L2. When the light transmittance is regulated according to the irradiation of the UV light L2, the irradiation region of the UV light L2 is the light-shielding region 30.

The light transmittance (the light-shielding percentage) of the light-shielding region 30 can be controlled with, for example, the intensity of the UV light L2. The light transmittance is reduced (the light-shielding percentage is increased) by increasing the intensity of the irradiated UV light L2, and thus it is also possible to set the light transmittance to nearly 0% (to set the light-shielding percentage to nearly 100%).

A specific method and a specific configuration for forming the cylindrical surface 20 including the transparent screen 25 and the light-shielding layer 26 are not limited. Each end of the transparent screen 25 and a corresponding end of the light-shielding layer 26 may be connected, or the transparent screen 25 and the light-shielding layer 26 in a state of being spaced from each other may each be supported by, for example, a transparent support member. For example, the cylindrical surface 20 is formed with uniform transparency around a full 360 degrees such that the boundary or the like is not visible. The configuration is not limited to this, and the boundary between the front side and the rear side, or the boundary between respective members may be visible to the extent that viewing of the image 5 from the front side is not interrupted.

Further, the transparent screen 25 is not limited to being provided in the entirety of the semi-circular portion on the front side, and may be provided in a portion on the front side. In this case, a region that is a portion on the front-side inner periphery 21a is set to be a projection-target region. The light-shielding layer 26 may be provided as appropriate according to, for example, the position of the transparent screen 25. In other words, a region in which the light-shielding layer 26 can be formed may be set as appropriate according to, for example, the position of a projection-target region.

Figure 4:
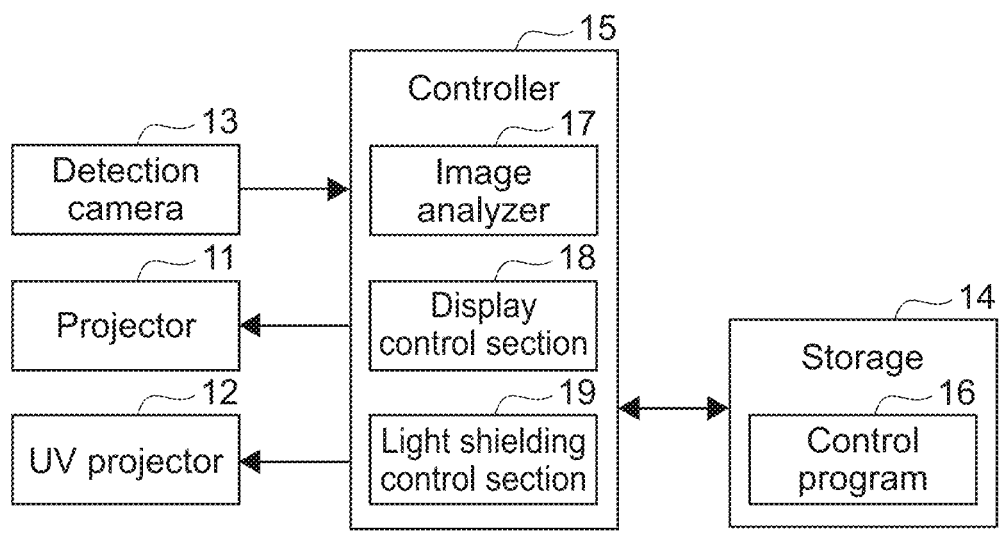
FIG. 4 is a block diagram of an example of a functional configuration of the image display apparatus.

FIG. 4 is a block diagram of an example of a functional configuration of the image display apparatus 100 according to the present embodiment. The image display apparatus 100 further includes a detection camera 13, the storage 14, and the controller 15.

The detection camera 13 is a camera for detecting a point-of-sight position P of the user 1, in which a position and an angle of view are set such that it is possible to perform image-capturing on an entire viewing range for viewing the image 5. In the present embodiment, the front side of the transparent screen 25 in the cylindrical shape is the viewing range, and the user 1 can view the image 5 while moving his/her face within the range. The detection camera 13 is capable of capturing an image of the face of the user 1 that is situated at any position in the viewing range.

FIG. 3 schematically illustrates the detection camera 13, but the position at which the detection camera 13 is installed is not limited. For example, the detection camera 13 may be installed on the base 10 or at any position above. Further, a plurality of detection cameras 13 may be installed.

For example, a digital camera that includes an image sensor such as a complementary metal-oxide semiconductor (CMOS) sensor or a charge coupled device (CCD) sensor is used as the detection camera 13. Further, for example, an infrared camera with an on-board infrared illumination such as an infrared LED may be used. In the present embodiment, the detection camera 13 serves as an image-capturing section.

The storage 14 is a nonvolatile storage device, and, for example, a hard disk device (HHD) or the like is used. The storage 14 stores therein a control program 16 for controlling an entire operation of the image display apparatus 100. The method for installing the control program 16 on the image display apparatus 100 is not limited.

The controller 15 controls an operation of each block included in the image display apparatus 100. The controller 15 has a hardware configuration including, for example, a CPU and a memory (RAM and ROM) that are necessary for a computer. Various processes are performed by the CPU loading, into the RAM, the control program 16 stored in the storage 14 and executing the control program 16.

A programmable logic device (PLD) such as a field programmable gate array (FPGA), or a device such as an application specific integrated circuit (ASIC) may be used as the controller 15.

In the present embodiment, an image analyzer 17, a display control section 18, and a light-shielding control section 19 are implemented as functional blocks by the CPU of the controller 15 executing a program according to the present embodiment. Then, an image processing method according to the present embodiment is performed by these functional blocks. Note that dedicated hardware such as an integrated circuit (IC) may be used as appropriate in order to implement the respective functional blocks.

The image analyzer 17 analyzes an image of the user 1 that is captured by the detection camera 13, and calculates a point-of-sight position P. For example, the point-of-sight position P is calculated using a coordinate value based on a coordinate system that is set for a viewing range in advance. The method for setting a coordinate system for a viewing range is not limited. Note that other information may be acquired as information regarding a point-of-sight position P.

The method for analyzing an image of the user 1 to calculate a point-of-sight position P is not limited, and, for example, any face authentication technology or any image analysis technology may be used. Further, a machine learning algorithm using a recurrent neural network (RNN), a convolutional neural network (CNN), or a deep neural network (DNN) such as multilayer perceptron (MLP) may be used.

In the present embodiment, the point-of-sight position P is included in eye information regarding an eye of the user 1. In the present embodiment, an acquisition section that acquires the eye information is implemented by the image analyzer 17 and the detection camera 13.

The display control section 18 generates the image 5 displayed by the projector 11 and controls an operation of display performed by the projector 11. In the present embodiment, according to the point-of-sight position P calculated by the image analyzer 17, the image 5 to be displayed is selected, or the display position of the selected image 5 or the like is controlled. Further, any image processing or any display control may be performed. In the present embodiment, an image display section may be implemented by the display control section 18 and the projector 11.

The light-shielding control section 19 controls an operation of irradiation of the UV light L2 that is performed by the UV projector 12. In the present embodiment, a region irradiated with the UV light L2 is controlled according to the point-of-sight position P calculated by the image analyzer 17, and according to information regarding the image 5 to be displayed. In other words, the position, the shape, the size, and the like of the light-shielding region 30 are controlled. In the present embodiment, a light-shielding section is implemented by the light-shielding layer 26, the light-shielding control section 19, and the UV projector 12.

[Operation of Image Display Apparatus]

When the image 5 is displayed on the transparent screen 25, first, a point-of-sight position P of the user 1 is calculated by the image analyzer 17. Image data regarding the image 5 displayed on the transparent screen 25 is generated by the display control section 18 using the point-of-sight position P. The generating the image data includes, for example, reading the image data stored in, for example, the storage 14. The generated image data is output to the projector 11.

Further, the display position, the display size, and the like of the image 5 are set by the display control section 18 according to the point-of-sight position P, and a control signal is output to the projector 11 by the display control section 18. According to the image data and the control signal output by the display control section 18, an image is projected onto the transparent screen 25 by the projector 11. Accordingly, the image 5 is displayed at a position, on the display surface 28, that corresponds to the point-of-sight position P of the user 1.

Figure 5:
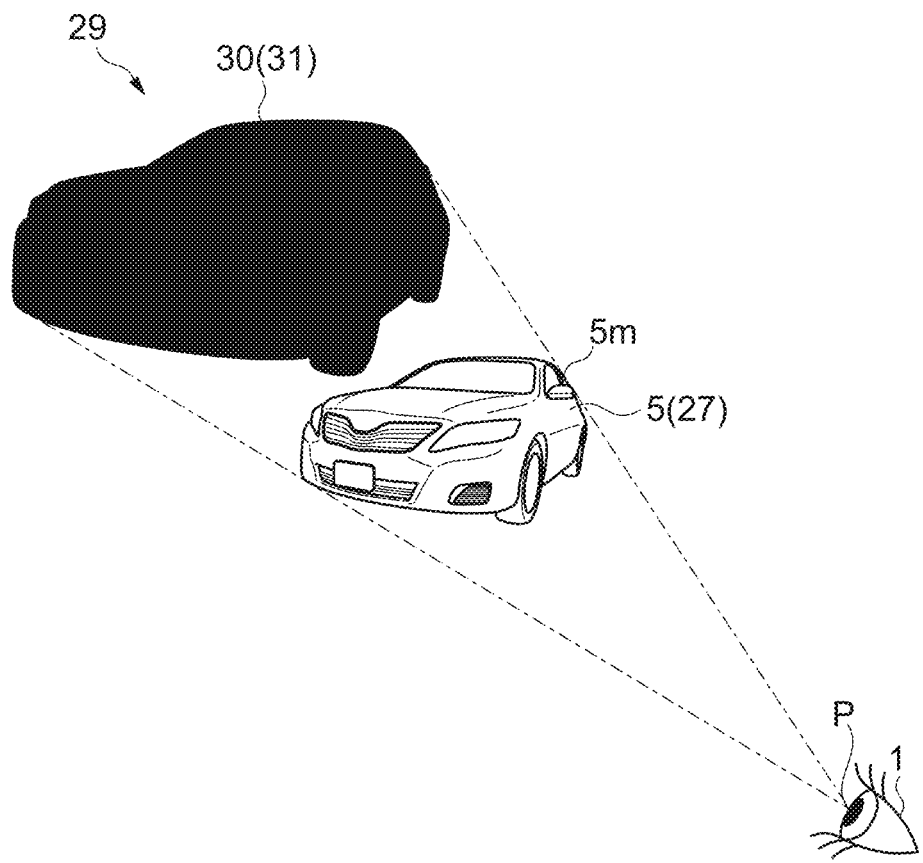
FIG. 5 is a schematic diagram describing an example of a method for generating a light-shielding region.

FIG. 5 is a schematic diagram describing an example of a method for generating the light-shielding region 30. When the image 5 is displayed on the transparent screen 25, the position, the shape, the size, and the like of the light-shielding region 30 are set by the light-shielding control section 19 according to the point-of-sight position P and according to the information regarding the image 5 displayed on the display surface 28. Then, the light-shielding region 30 is generated in a region 31 that corresponds to the display region 27 of the image 5 displayed on the display surface 28.

In the present embodiment, a region that is formed by projecting an edge 5m of the image 5 onto the light-shielding surface 29 from a position of the eye of the user 1, is calculated as the region 31 corresponding to the display region 27. The position, the shape, the size, and the like of the calculated region 31 are respectively set to be the position, the shape, the size, and the like of the light-shielding region 30. The light-shielding control section 19 outputs a control signal to the UV projector 12 such that the set light-shielding region 30 is formed.

The UV light L2 is irradiated onto the light-shielding surface 29 by the UV projector 12 according to the control signal output by the light-shielding control section 19. Accordingly, the light-shielding region 30 having a shape substantially analogous to the shape of the displayed image 5, can be formed as the light-shielding region 30 corresponding to the display region 27 of the image 5 displayed on the display surface 28. Note that the substantially analogous shape includes substantially the same shape (a substantially congruent shape).

The light-shielding region 30 is formed in a region behind the image 5, as viewed from the user 1. Thus, the light-shielding region 30 itself overlaps the image 5, and is not visible to the user 1.

The method for calculating a region that is formed by projecting the edge 5m of the image 5 onto the light-shielding surface 29 from a position of the eye of the user 1, is not limited. For example, pixels corresponding to the edge 5m of the image 5 are calculated using image information regarding the displayed image 5 (information including information regarding each pixel). The projection position (corresponding to the display position on the display surface 28) of the image light L1 emitted from the pixels corresponding to the edge 5m is calculated using information regarding the projection direction, the zoom, and the like of the projector 11.

An intersection (coordinate location) of a straight line and the light-shielding surface 29 is calculated, the straight line connecting a point-of-sight position of the user 1 (coordinate value) to a display position of the edge 5m (coordinate value). The calculated intersection (coordinate value) is a position when the edge 5m of the image 5 is projected onto the light-shielding surface 29. For example, the position or the like of the light-shielding region 30 can be calculated by the processing described above. Of course, another algorithm may be used.

Figure 6:
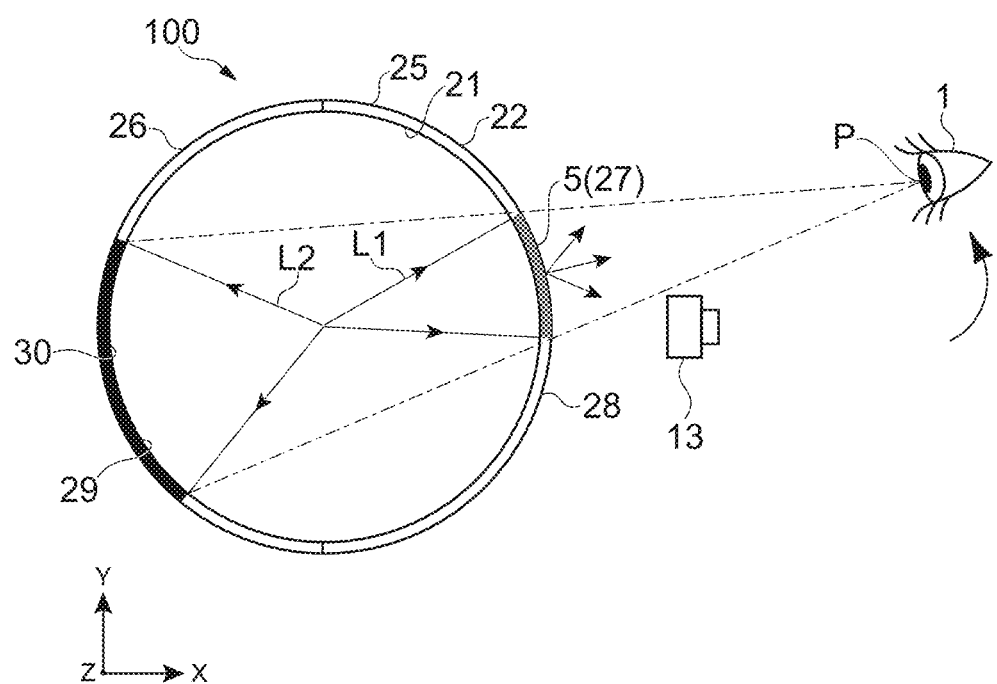
FIG. 6 is a schematic diagram illustrating a case in which a point-of-sight position of a user has moved.

FIG. 6 is a schematic diagram illustrating a case in which the point-of-sight position P of the user 1 has moved. It is assumed that, as illustrated in FIG. 6, the point-of-sight position P has moved clockwise (counterclockwise in the figure as viewed from above) with respect to the image display apparatus 100. In this case, the displayed image 5 and the display position of the image 5 are changed following the movement of the point-of-sight position P.

For example, the image 5 in which a vehicle (the image 5) illustrated in, for example, FIG. 1 has been rotated such that the right side of the vehicle is situated in front, is displayed, and the emission direction of the projector 11 is also moved to be oriented toward the point-of-sight position P. Consequently, the display position is changed to the left on the inner periphery 21 of the transparent screen 25, as viewed from the side of the projector 11.

As viewed from the user 1, it is possible to have a viewing experience in looking down, from right, the space above the base 10 to gaze at the vehicle suspended in air at the same position in the space above the base 10. This results in being able to enjoy viewing the image 5.

The light-shielding control section 19 changes the light-shielding region 30 following the movement of the point-of-sight position P and a change in image or display position. In other words, the light-shielding region 30 is formed in the region 31 corresponding to the display region 27 of the image 5 displayed according to the movement of the point-of-sight position P. Specifically, the light-shielding region 30 having a shape substantially analogous to the shape of the vehicle as viewed from right, is formed.

As described above, in the image display apparatus 100 according to the present embodiment, according to the point-of-sight position P that is eye information regarding an eye of the user 1, the light-shielding region 30 is formed in the region 31 corresponding to the display region 27 of the image 5 displayed on the transparent screen 25. This makes it possible to improve the visibility of the image 5.

When the image 5 is caused to be displayed on, for example, the transparent screen 25, the background can be seen through the transparent screen 25, and thus there is a possibility that the contrast and the color reproductivity of the image 5 will be reduced due to the impact of the brightness and the color of the background. This results in a very low visibility of the image 5 and in being unable to enjoy viewing the image 5.

In the present embodiment, the light-shielding region 30 is formed in the region 31 corresponding to the display region 27 of the image 5. Thus, as viewed from the user 1, a portion on which the image 5 is displayed is shielded from light, and thus the image 5 is displayed with a favorable contrast and color reproductivity. On the other hand, a portion other than the portion on which the image 5 is displayed remains transparent, which provides a viewing effect of providing viewing of the image 5 appearing to be situated in the background.

Further, since the position and the like of the light-shielding region 30 is controlled following the movement of the image 5, it is possible to view the image 5 exhibiting a favorable contrast and color reproductivity even if the image 5 is viewed from any direction in a viewing range. In other words, an image display with a very high degree of accuracy is performed.

For example, with respect to a case in which the type of the displayed image 5 is determined in advance as in the case of the image 5 of the vehicle illustrated in FIG. 1, the display of an image and the generation of the light-shielding region 30 may be performed using table information. For example, image generation table in which the point-of-sight position P; the type, the display position, and the like of the image 5; and the position and the like of the light-shielding region 30 are associated with one another, may be generated in advance to be stored in the storage 14. When the image 5 is displayed, the image generation table is referred to according to the point-of-sight position P calculated by the image analyzer 17, and the display of the image 5 and the generation of the light-shielding region 30 are performed. This makes it possible to improve the processing speed, and thus to accurately display the image 5 following the movement of the point-of-sight position P.

Figure 7:
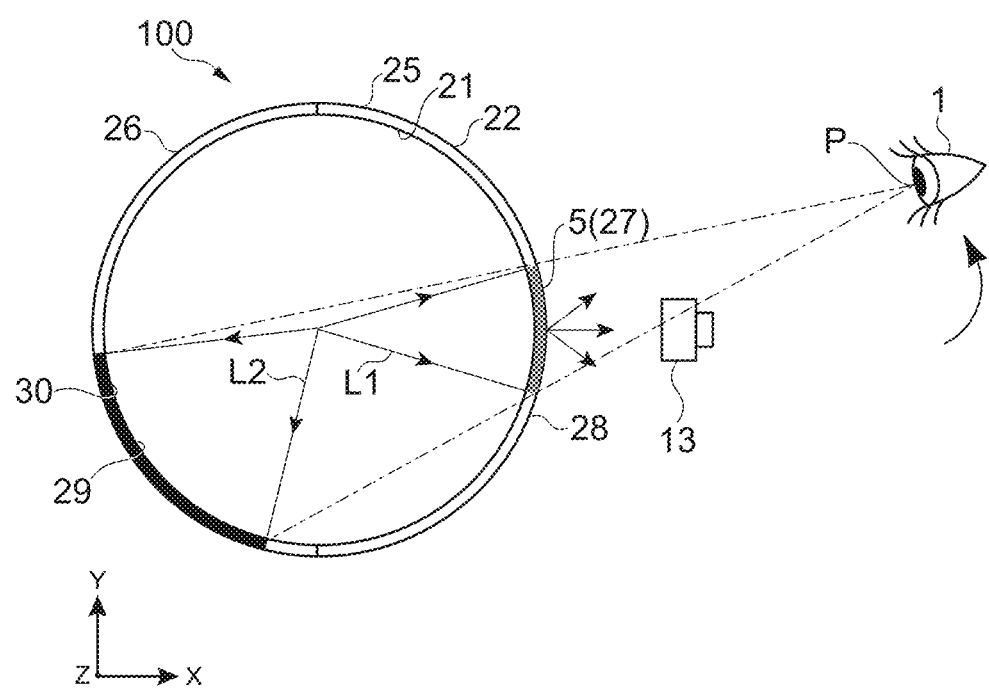
FIG. 7 is a schematic diagram illustrating a case in which the display position of a displayed image is fixed.

The displayed image 5 and the display position of the displayed image 5 may be fixed, as illustrated in FIG. 7. Also in this case, it is possible to keep the level of visibility of the image 5 high by forming the light-shielding region 30 according to the point-of-sight position P.

Figure 8A:
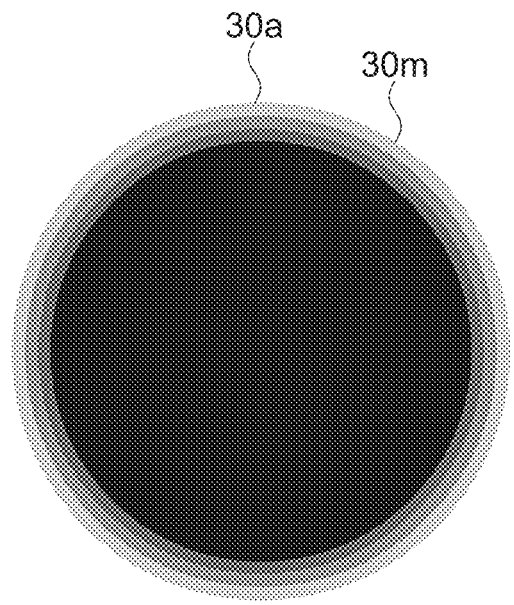
FIGS. 8A and 8B schematically illustrate examples of the light-shielding region formed on a light-shielding surface.
Figure 8B:
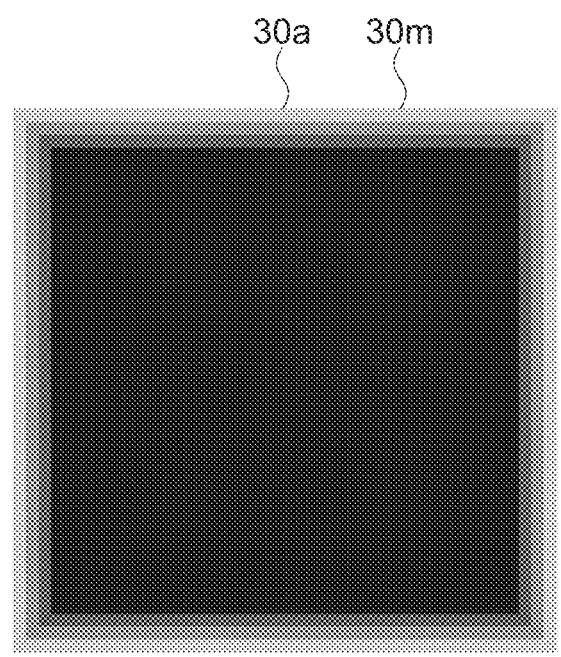

FIGS. 8A and 8B schematically illustrate examples of the light-shielding region 30 formed on the light-shielding surface 29. FIGS. 8A and 8B respectively illustrate a circular light-shielding region 30a and a rectangular light-shielding region 30b, the light-shielding region 30a and the light-shielding region 30b being the light-shielding regions 30 each having a shape substantially analogous to the shape of the image 5 displayed on the display surface 28.

How to set the light transmittance (the light-shielding percentage) in the light-shielding region 30 is not limited, and may be set discretionarily such that the visibility of the image 5 can be improved. For example, light-shielding region 30 is formed such that the entire light-shielding region 30 exhibits light transmittance of nearly 0% (a light-shielding percentage of nearly 100%). Of course, the entire light-shielding region 30 is not limited to exhibiting light transmittance of nearly 0% (a light-shielding percentage of nearly 100%), and the light transmittance (the light-shielding percentage) may be set discretionarily.

The light-shielding region 30 may be formed such that the light transmittance (the light-shielding percentage) varies in the light-shielding region 30, as illustrated in FIGS. 8A and 8B. For example, the light transmittance may be increased (the light-shielding percentage may be reduced) around an edge 30m of the light-shielding region 30 in a direction outward from the light-shielding region 30. In other words, around the edge 30m of the light-shielding region 30, the light transmittance (the light-shielding percentage) may be controlled such that the light-shielding region 30 gradually gets close to a transparent state. This makes it possible to vary the light transmittance (the light-shielding percentage) gradually in the boundary between the light-shielding region 30 and a transparent region outside the light-shielding region 30 on the light-shielding surface 29.

Note that the direction outward from the light-shielding region 30 is not limited to a single direction, and includes any direction from the inside to the outside. For example, in the example illustrated in FIG. 8A, the light transmittance is increased in a direction extending outward from the center of the circular light-shielding region 30a. In the example illustrated in FIG. 8B, the light transmittance is increased in a direction orthogonal to each side of the rectangular light-shielding region 30b. Further, in its four corner portions, the light transmittance is increased in a direction extending outward from the center of the rectangular light-shielding region 30b.

The method for increasing the light transmittance is also not limited, and any setting, such as increasing the light transmittance linearly with respect to a distance to the edge 30m, or varying an increase rate depending on a position of the edge 30m according to the shapes of the image 5 and the light-shielding region 30, may be performed. Further, it is also possible to vary the light transmittance in stages.

When the light-shielding region 30 is formed to overlap the image 5 in a state in which the light-shielding region 30 has a shape substantially analogous to the shape of the image 5, the edge 30m of the light-shielding region 30 is not directly visible, and thus viewing of the image 5 is not interrupted. However, when the displayed image 5 has a complicated shape, or depending on, for example, the resolution (the number of pixels) of the UV projector 12 or the accuracy in installation of each projector, the image 5 and the light-shielding region 30 may be slightly out of alignment. In this case, the edge 30*m* of the light-shielding region 30 may be beyond the image 5 (the display region 27), and may become directly visible.

In such a case, it is possible to prevent the edge 30*m* of the light-shielding region 30 from being noticeable and from interrupting viewing of the image 5, by controlling the light transmittance around the edge 30*m* of the light-shielding region 30, as illustrated in FIGS. 8A and 8B. On the other hand, with respect to the image 5, almost all of the center region is shielded from light coming from the back. Thus, even if the light transmittance is slightly high (the light-shielding percentage is slightly low) around the edge 5*m* of the image 5, this has little impact on the visibility of the image 5. Consequently, an image display with a very high degree of accuracy is performed.

Second Embodiment

An image display apparatus according to a second embodiment of the present technology is described. In the following descriptions, descriptions of a configuration and an operation similar to those of the image display apparatus 100 of the embodiment described above are omitted or simplified.

Figure 9A:
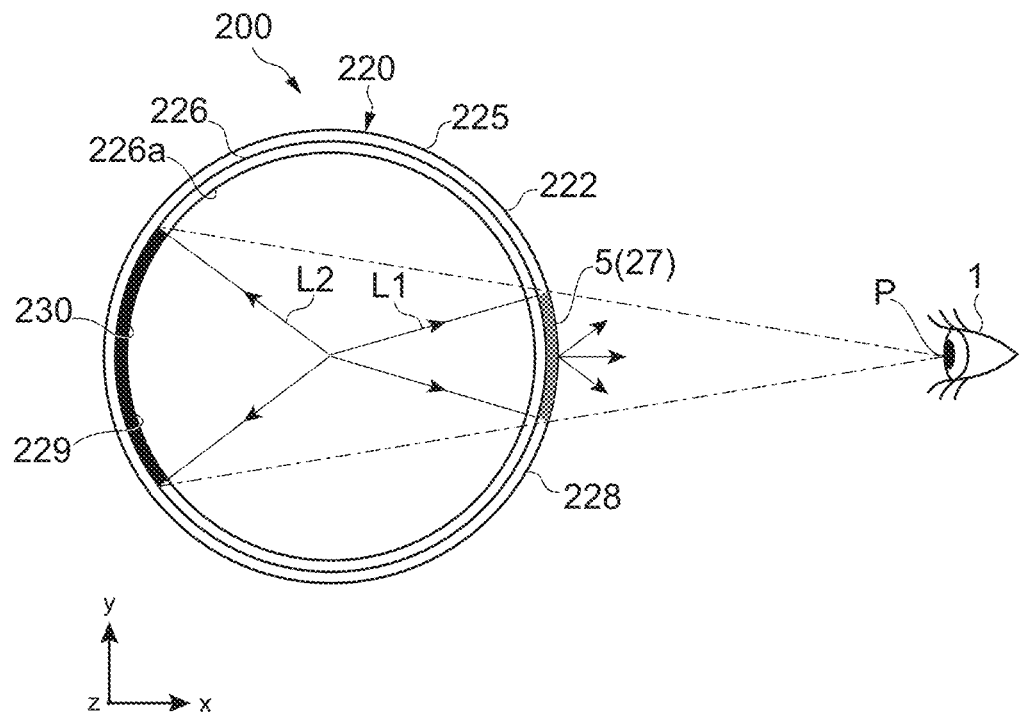
FIGS. 9A and 9B are schematic diagrams primarily illustrating a cylindrical surface of an image display apparatus according to a second embodiment as viewed from above.
Figure 9B:
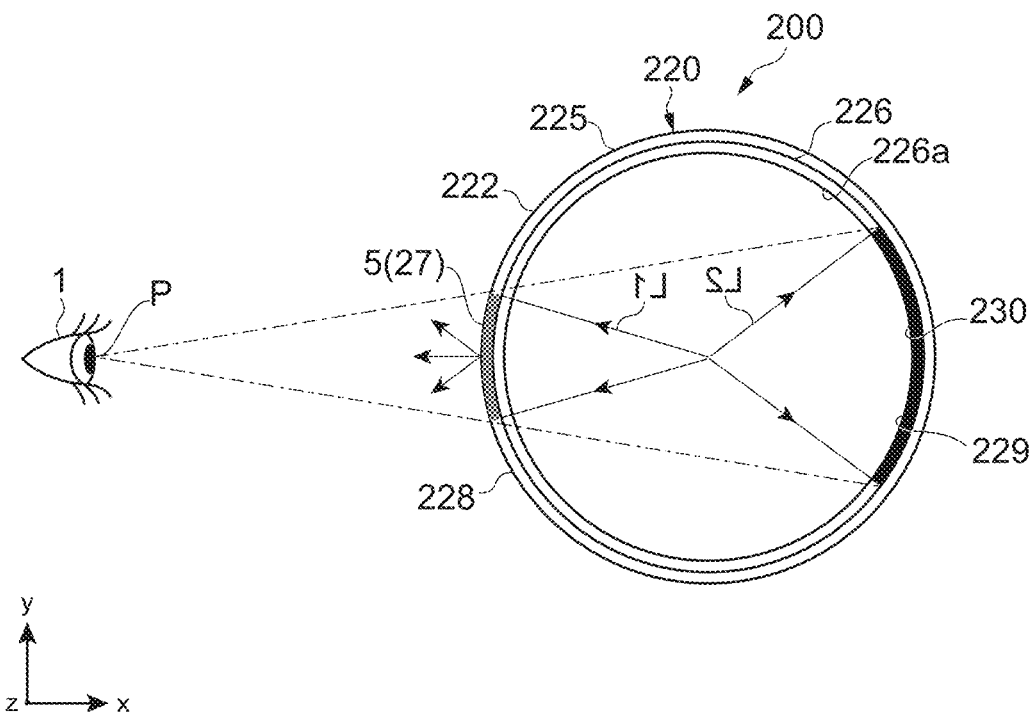

FIGS. 9A and 9B are schematic diagrams primarily illustrating a cylindrical surface 220 of an image display apparatus 200 according to the present embodiment as viewed from above. The cylindrical surface 220 according to the present embodiment includes a transparent screen 225 and a light-shielding layer 226 having transparency that are arranged in a layered formation.

Specifically, the transparent screen 225 having a cylindrical shape is provided around a full 360 degrees. Then, the light-shielding layer 226 is arranged, in a layered formation, on the inner peripheral side of the transparent screen 225 around a full 360 degrees. Thus, in the present embodiment, the transparent screen 225 and the light-shielding layer 226 are provided all around the image display apparatus 200 regardless of whether it is on the front side or the rear side.

Consequently, the entirety of an outer periphery 222 of the transparent screen 225 provided around a full 360 degrees is a display surface 228 on which the image 5 is displayed, and an entire periphery of the image display apparatus 200 is a viewing range. Further, the entirety of an inner periphery 226*a* of the light-shielding layer 226 provided around a full 360 degrees is a light-shielding surface 229 that is capable of controlling the light transmittance.

As illustrated in FIGS. 8A and 8B, the user 1 can view the image 5 from any position of the entire periphery of the image display apparatus 200 regardless of whether it is on the front side or the rear side of the image display apparatus 200. A detection camera is installed so that it is possible to capture an image of the face of the user 1 that is situated at any position in the viewing range, although the illustration of the detection camera is omitted. The point-of-sight position P of the eye of the user 1 is calculated using the image of the user that is captured by the detection camera.

The image 5 is displayed on the outer periphery 222 (the display surface 228) of the transparent screen 225 according to the calculated point-of-sight position P. For example, a projector is configured such that the image light L1 can be emitted around a full 360 degrees. The image light L1 is emitted to the transparent screen 225 by the projector being controlled, and the image 5 is displayed on the display surface 228.

According to the calculated point-of-sight position P and the position or the like of the displayed image 5, a light-shielding region 230 is formed in a region corresponding to the display region 27 of the image 5 displayed on the display surface 228. For example, a UV projector is configured such that the UV light L2 can be emitted around a full 360 degrees. The UV light L2 is emitted to the light-shielding layer 226 by the UV projector being controlled, and the light-shielding region 230 is formed on the light-shielding surface 229.

Note that, when the image 5 is not displayed, the back (the rear side) can be seen through the cylindrical surface 220 when the cylindrical surface 220 is viewed from any direction. Thus, a substantially transparent space is provided, and an excellent viewing effect of providing viewing of an object being suspended in air in a transparent space is provided when the image 5 is displayed.

Third Embodiment

Figure 10:
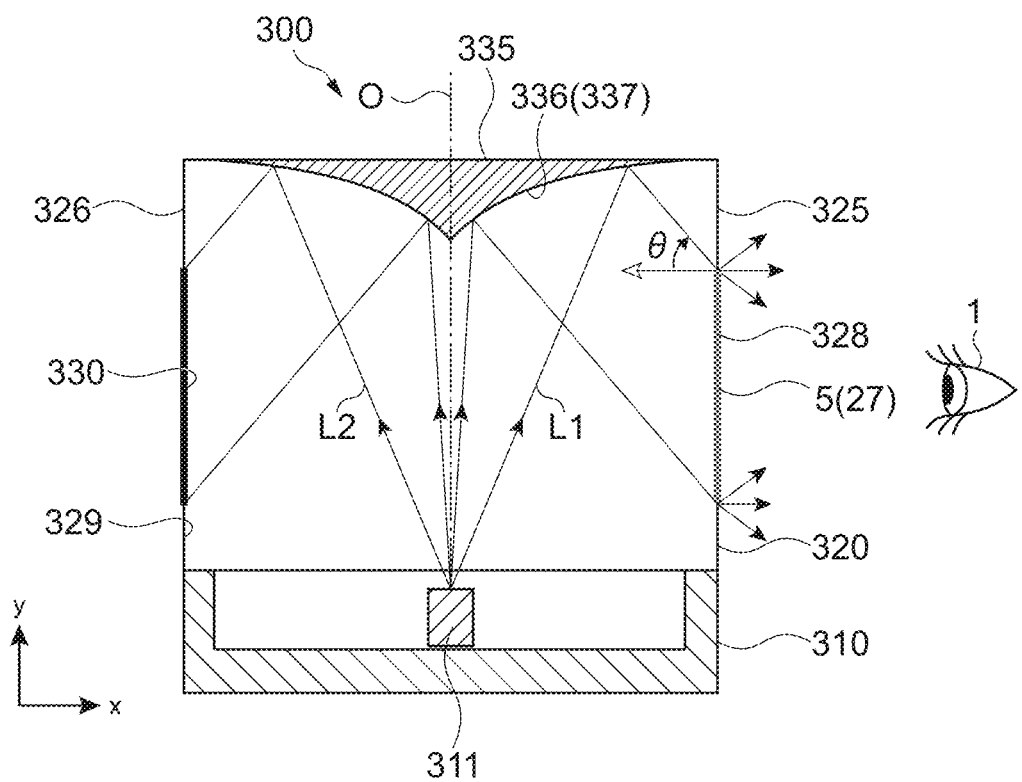
FIG. 10 is a cross-sectional view of an example of a configuration of an image display apparatus according to a third embodiment.

FIG. 10 is a cross-sectional view of an example of a configuration of an image display apparatus according to a third embodiment. An image display apparatus 300 is provided with an integrated projector 311 instead of the projector 11 and the UV projector 12 of the image display apparatus 100 described in the first embodiment. Further, the image display apparatus 300 is provided with a reflective mirror 335 instead of the top surface 35 of the image display apparatus 100.

The integrated projector 311 is capable of emitting both the image light L1 and the UV light L2. For example, the integrated projector 311 is capable of performing, at the same time, an emission of the image light L1 to an entire region (full angle of view) onto which projection can be performed, and an emission of the UV light L2 to the entire region (full angle of view), or is capable of performing switching between the emission of the image light L1 and the emission of the UV light L2. Further, the integrated projector 311 is also capable of performing, at the same time, an emission of the image light L1 to a certain region and an emission of the UV light L2 to the other region. In other words, the integrated projector 311 is also capable of emitting the image light L1 to a right half region in an entire region (full angle of view) onto which projection can be performed, and of emitting the UV light L2 to a left half region in the entire region (full angle of view).

As illustrated in FIG. 10, the integrated projector 311 is installed at approximately the center of a cylindrical base 310 to be oriented upward. The integrated projector 311 emits the image light L1 and the UV light L2 on the basis of an optical axis O that extends in an up-down direction (a Y direction).

In the present embodiment, the integrated projector 311 serves as an image emission section that emits the image light L1, and that is capable of emitting light of a specified wavelength band and also serves as a light-shielding section. A specific configuration of the integrated projector 311 is not limited, and any configuration may be used.

The reflective mirror 335 includes a reflective surface 336 off which emitted light (the image light L1 and the UV light L2) emitted by the integrated projector 311 is reflected. The reflective mirror 335 is centered on the optical axis O and arranged to face the integrated projector 311, so that the reflective surface 336 is oriented toward the integrated projector 311.

In the present embodiment, the reflective surface 336 has a shape rotationally symmetric about the optical axis O. Specifically, the reflective surface 336 includes a rotational surface 237 having a shape of a curve rotated about the optical axis O, the curve being obtained by cutting a portion out of a parabola. The rotational surface 237 is configured such that a concave side of the parabola (a focal-point side of the parabola) is a side (the reflective surface 236) off which light is reflected and such that an axis of the parabola is different from the optical axis O.

A specific configuration and the like of the reflective mirror 335 are not limited. For example, any material such as resin such as acrylic, glass, or metal may be used as a material of which the reflective mirror 335 is made. Further, for example, high-reflectance coating using a thin film made of, for example, aluminum or silver may be applied to the reflective surface 336 of the reflective mirror 335. This makes it possible to cause emitted light to be efficiently reflected off the reflective surface 336.

The emitted light (the image light L1 and the UV light L2) emitted radially upward from the integrated projector 311 is radially reflected off the reflective surface 336 of the reflective mirror 335 to be directed to a transparent cylindrical surface 320 around a full 360 degrees. As described above, the reflective surface 336 includes the parabolic rotational surface 337. Thus, as illustrated in FIG. 10, an incident angle θ of emitted light reflected off the rotational surface 337 with respect to the cylindrical surface 320 is substantially constant. In other words, in the present embodiment, the incident angle of emitted light with respect to the cylindrical surface 320 is controlled by the reflective mirror 335 to be substantially constant.

Since the cylindrical surface 320 has a configuration similar to the cylindrical surface of the first embodiment, a transparent screen 325 is arranged on the front side, and a light-shielding layer 326 is arranged on the rear side. As illustrated in FIG. 10, from below upward, the integrated projector 311 emits the image light L1 to a region situated on the front side of the reflective surface 336, and emits the UV light L2 to a region situated on the rear side of the reflective surface 336. Accordingly, the image light L1 is projected onto the transparent screen 325 situated on the front side, and the UV light L2 is irradiated onto the light-shielding layer 326 situated on the rear side.

This makes it possible to display the image 5 on a display surface 328 according to the point-of-sight position P of the eye of the user 1, using a single integrated projector 311. Further, it becomes possible to form, on a light-shielding surface 329, a light-shielding region 330 corresponding to the display region 27 of the image 5.

Note that, when the image light L1 is projected onto the transparent screen 325, an incident angle of the image light L1 with respect to the transparent screen 325 is controlled by the reflective mirror 335 to be substantially constant. This makes it possible to sufficiently suppress, for example, unevenness in an image due to the incident-angle selectivity of a hologram screen. This results in being able to display a high-quality image on, for example, the transparent screen 325 using a hologram screen. Further, it is no longer necessary to correct, for example, an image signal, and thus it is possible to project an image with inherent irradiation intensity. This results in being able to display a bright image. In other words, this makes it possible to improve the visibility of the image 5.

Further, it is possible to keep an irradiation angle of reference light constant to create an interference pattern when a hologram screen is exposed to light. In the case of such a mono-slant hologram screen, it is possible to achieve a high diffraction efficiency by causing the image light L1 to enter at an incident angle identical to the irradiation angle of reference light. For example, it is possible to obtain, for example, a very-high-intensity transparent display by using, in conformity to the incident angle of the image light L1 controlled by the reflective surface 336, a mono-slant transmissive hologram screen for which the irradiation angle of reference light is set.

Furthermore, in the present embodiment, the image light L1 reflected off the reflective mirror 335 arranged above to be directed downward, enters the transparent screen 325. Thus, when a transmissive hologram screen or the like is provided in conformity to the incident angle of the image light L1, outside light or the like that enters the display surface 328 of the transparent screen 325 is transmitted straight through the transparent screen 325.

This makes it possible to sufficiently suppress, for example, a phenomenon in which the light of, for example, an illumination lamp is reflected on the display surface 328 of the transparent screen 325. This results in being able to reduce an impact that outside light or the like has on the image 5 displayed on the transparent screen 325, and thus in being able to display a sufficiently-high-quality image.

Note that it is also possible to install the integrated projector 311 and the reflective mirror 335 according to the present embodiment in the image display apparatus 200 illustrated in FIGS. 9A and 9B and described as the second embodiment. The emission of the image light L1 to the reflective surface 336 is controlled such that the image 5 can be displayed according to the point-of-sight position. Further, the emission of the UV light L2 to the reflective surface 336 is controlled such that the light-shielding region 330 corresponding to the display region 27 of the image 5 can be formed. Typically, the UV light L2 is irradiated onto a certain region on the reflective surface 327, the certain region being situated on a side opposite to a side of another region on the reflective surface 327 with respect to the center of the reflective mirror 335, the other region being a region onto which the image light L1 is projected. Of course, the configuration is not limited to this.

Fourth Embodiment

Figure 11:
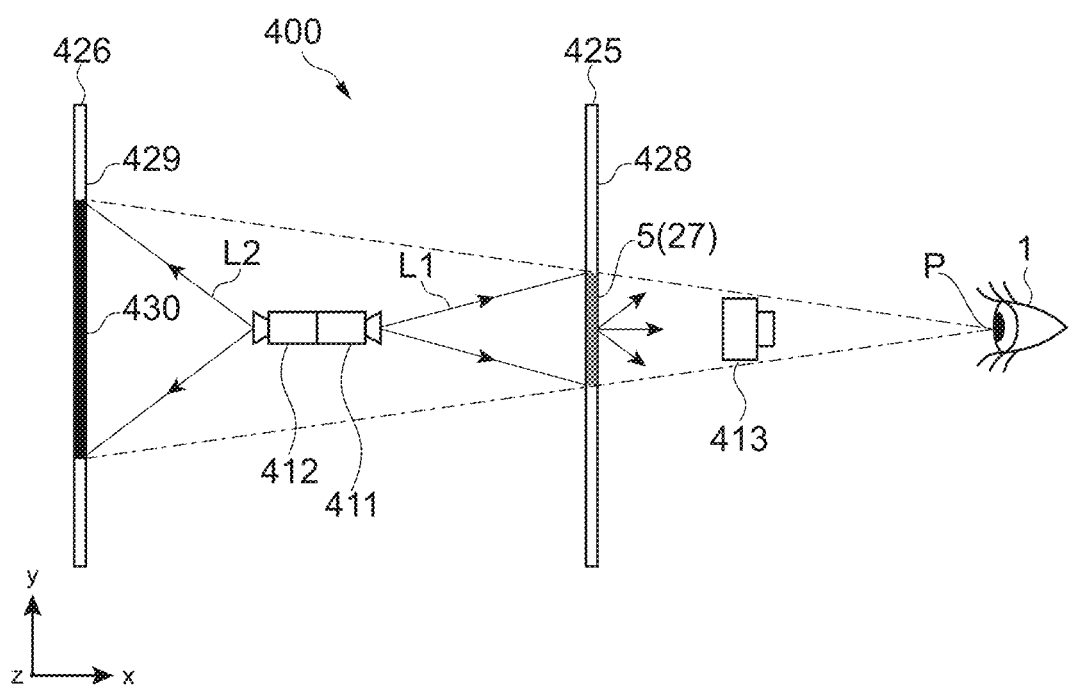
FIG. 11 schematically illustrates an image display apparatus according to a fourth embodiment as viewed from above.

FIG. 11 schematically illustrates an image display apparatus according to a fourth embodiment as viewed from above. An image display apparatus 400 includes a transparent screen 425 having a planar shape, and a light-shielding layer 426 having a planar shape and having transparency. The light-shielding layer 426 is arranged on the rear side of the transparent screen 425 to be spaced from the transparent screen 425.

A projector 411 and a UV projector 412 are arranged between the transparent screen 425 and the light-shielding layer 426. The projector 411 is arranged to be oriented toward the transparent screen 425 situated on the front side. The UV projector 412 is arranged to be oriented toward the light-shielding layer 426 situated on the rear side.

A surface on the front side of the transparent screen 425 is a display surface 428. The image 5 is displayed on the display surface 428 by the image light L1 being projected onto the transparent screen 425 by the projector 411. A surface on the front side of the light-shielding layer 426 is a light-shielding surface 429. A light-shielding region 430 is formed by the UV light L2 being irradiated onto the light-shielding surface 429 by the UV projector 412.

The point-of-sight position P of the user 1 is calculated using an image of the user 1 that is captured by a detection camera 413. The image 5 is displayed on the display surface 428 according to the point-of-sight position P of the user 1. Further, the light-shielding region 430 is formed in a region corresponding to the display region 27 of the image 5. This makes it possible to improve the visibility of the image 5.

Fifth Embodiment

Figure 12A:
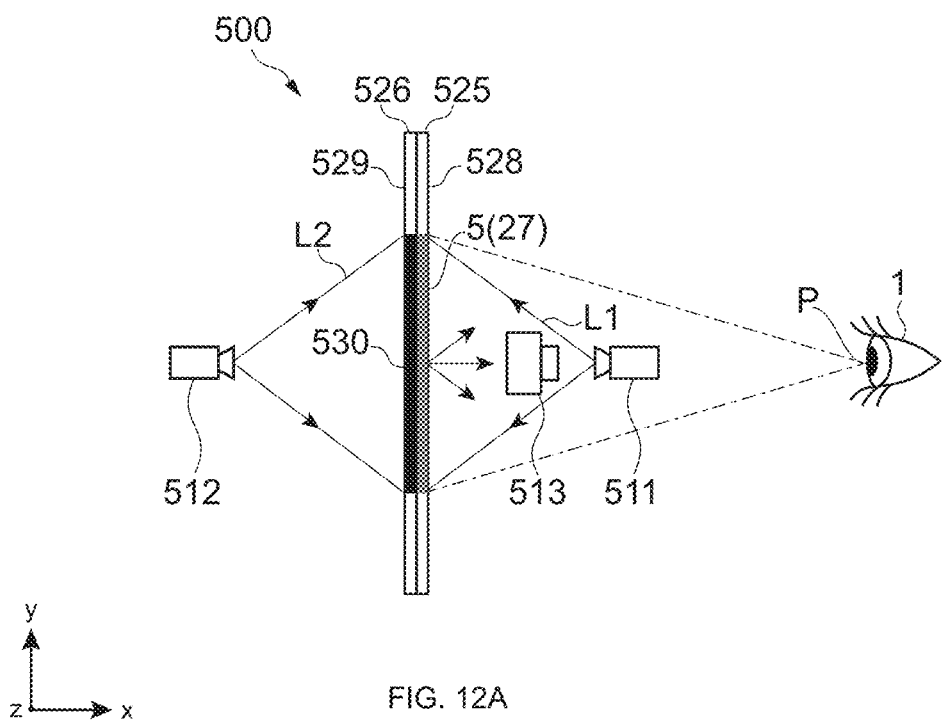
FIGS. 12A and 12B schematically illustrate an image display apparatus according to a fifth embodiment as viewed from above.
Figure 12B:
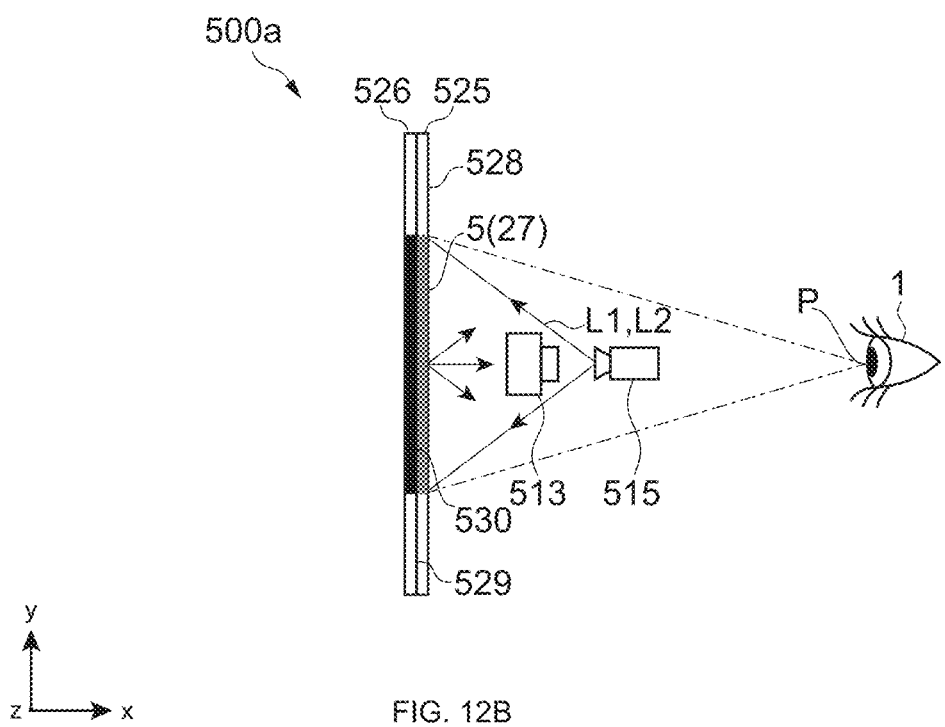

FIGS. 12A and 12B schematically illustrate an image display apparatus according to a fifth embodiment as viewed from above. An image display apparatus 500 illustrated in FIG. 12A includes a transparent screen 525 having a planar shape, and a light-shielding layer 526 having a planar shape and having transparency. The light-shielding layer 526 is arranged on the rear side of the transparent screen 525 in a layered formation.

In the present embodiment, a hologram screen that is formed of a reflective hologram is used as the transparent screen 525. Thus, a projector 511 is arranged on the front side of the transparent screen 525. The image 5 is displayed on a display surface 528 by the image light L1 being projected onto the transparent screen 525 by the projector 511, the display surface 528 being a surface on the front side of the transparent screen 525.

A UV projector 512 is arranged on the rear side of the light-shielding layer 526. A light-shielding region 530 is formed on a light-shielding surface 529 by the UV light L2 being irradiated onto the light-shielding layer 526 by the UV projector 512, the light-shielding surface 529 being a surface on the rear side of the light-shielding layer 526.

The point-of-sight position P of the user 1 is calculated using an image of the user 1 that is captured by a detection camera 513. The image 5 is displayed on the display surface 528 according to the point-of-sight position P of the user 1. Further, the light-shielding region 530 is formed in a region corresponding to the display region 27 of the image 5. This makes it possible to improve the visibility of the image 5.

In the case of an image display apparatus 500a illustrated in FIG. 12B, the transparent screen 525 is configured such that light of wavelength of a wavelength band (such as a visible-light band) used for the image light L1 is reflected off the transparent screen 525 and diffused and such that the UV light L2 is transmitted through the transparent screen 525. In other words, the transparent screen 525 is configured such that light of a specified wavelength can be transmitted through the transparent screen 525. This makes it possible to irradiate, from the front side of the transparent screen 525, the UV light L2 used to form the light-shielding region 530.

For example, as illustrated in FIG. 12B, an integrated projector 515 is arranged on the front side of the transparent screen 525. By the image light L1 and the UV light L2 being emitted at the same time by the integrated projector 515, the image 5 is displayed on the display surface 528 and the light-shielding region 530 is formed on the light-shielding surface 529, the display surface 528 being a surface on the front side of the transparent screen 525, the light-shielding surface 529 being a surface on the front side of the light-shielding layer 526. For example, it is possible to easily form the light-shielding region 530 having a shape substantially analogous to the shape of the image 5, by the UV light L2 being emitted (by the UV light being scanned) for the same pixels as the pixels for which the image light L1 is emitted (including pixels for which the image light L1 is scanned).

Sixth Embodiment

Figure 13:
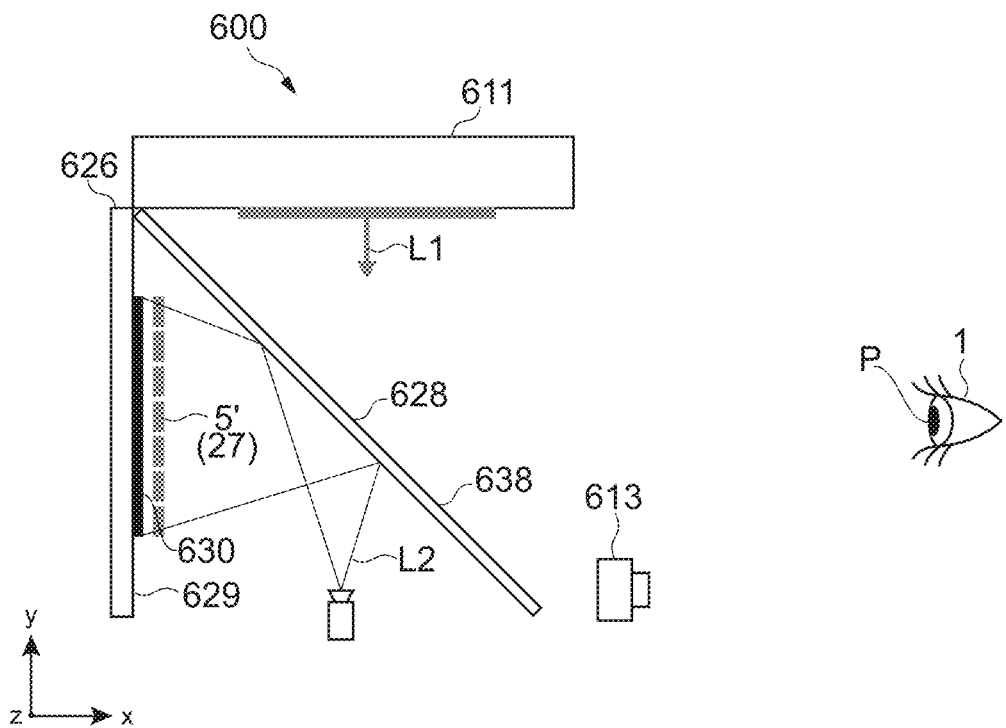
FIG. 13 schematically illustrates an image display apparatus according to a sixth embodiment as viewed from above.

FIG. 13 schematically illustrates an image display apparatus according to a sixth embodiment as viewed from above. An image display apparatus 600 is capable of displaying the image 5 using the so-called "Pepper's ghost". It is assumed that a direction in which the gaze of the user 1 is directed is the X direction, and a left-right direction as viewed from the user 1 is the Y direction. Further, it is assumed that an up-down direction as viewed from the user 1 is the Z direction.

The image display apparatus 600 includes a viewing display 611, a half mirror 638 having transparency, a light-shielding layer 626 having transparency, a UV projector 612, and a detection camera 613.

The viewing display 611 is arranged in parallel with the XZ plane such that the image light L1 can be emitted to the left as viewed from the user 1 (downward in the figure). Any display such as a liquid crystal display or an electroluminescence (EL) display may be used as the viewing display 611. In the present embodiment, the viewing display 611 serves as an image emission section. Note that the image emission section may be implemented by projecting an image onto a screen using a projector.

The half mirror 638 is arranged on the emission side of the viewing display 611 in the Y direction at an angle of approximately 45 degrees to the Y direction. The half mirror 638 exhibits the half-mirror characteristics with respect to light of a wavelength of a visible-light band that is used as the image light L1, and exhibits the fully reflective characteristics with respect to the UV light L2 emitted by the UV projector 612.

Thus, a portion of the image light L1 emitted from the viewing display 611 is reflected off the half mirror 638 in the X direction to be directed to the user 1 Accordingly, a virtual image (a Pepper's ghost image) 5' generated in front with the image light L1 is visible to the user 1.

In the present embodiment, the half mirror 638 corresponds to a reflective member having transparency, and a reflective surface off which the image light L1 is reflected corresponds to a display surface 628. A reflective member different from the half mirror 638 may be used as the reflective member. For example, a dichroic mirror or the like that is capable of splitting incident light with a specified light-intensity ratio may be used.

The light-shielding layer 626 is arranged parallel to a YZ plane to be oriented toward the half mirror 638. A surface on the front side of the light-shielding layer 626 is a light-shielding surface 629, and the light-shielding surface 629 is arranged on a side opposite to a side of the eye of the user 1 with respect to the half mirror 638.

The UV projector 612 is arranged beside the viewing display 611 and the half mirror 638 in the Z direction. The UV projector 612 is arranged on a side opposite to a side of the viewing display 611 with respect to the half mirror 638, and irradiates the UV light L2 onto the half mirror 638. The irradiated UV light L2 is reflected off the half mirror 638 to be directed to the light-shielding layer 626. Accordingly, a light-shielding region 630 is formed on the light-shielding surface 629 of the light-shielding layer 626.

The point-of-sight position P of the user 1 is calculated using an image of the user 1 that is captured by the detection camera 613. An image (the virtual image 5') is displayed on the display surface 628 according to the point-of-sight position P of the user 1. Further, the light-shielding region 630 is formed in a region corresponding to the display region 27 of the image (the virtual image 5'). This makes it possible to improve the visibility of the image (the virtual image 5').

Other Embodiments

The present technology is not limited to the embodiments described above, and may achieve other various embodiments.

In the descriptions described above, a photochromic layer made of photochromic material is provided as a light-shielding section, the photochromic material being capable of controlling the light transmittance according to the irradiation performed in a specified wavelength band. The configuration of the light-shielding section is not limited to this, and the light-shielding section may be implemented by applying any configuration that makes it possible to control the light transmittance.

For example, the light-shielding section may include a light-shielding surface that is capable of controlling the light transmittance according to a change in temperature (a change in heat), and a temperature control section that controls the temperature of the light-shielding surface. For example, a light-shielding layer is made of thermochromic material that is colored due to a change in temperature, and an IR projector that is capable of irradiating infrared light (IR light) is used as the temperature control section. Alternatively, a transparent heater or the like may be used as the temperature control section.

A specific nature of thermochromic material is not limited, and the thermochromic material may be selected as appropriate so that a desired light transmittance can be achieved. Furthermore, the color produced according to the irradiation of the IR light is also not limited to black. It is possible to control the light transmittance (the light-shielding percentage) by controlling the intensity of IR light irradiated onto a light-shielding layer made of thermochromic material and the amount of heat applied, and this results in being able to control the light transmittance (the light-shielding percentage) and to form light-shielding regions as illustrated in FIGS. 8A and 8B.

Further, the light-shielding section may include, for example, a liquid crystal display including a liquid crystal layer that is capable of controlling the light transmittance. In other words, a configuration may be adopted that makes it possible to adjust the light transmittance using liquid crystal. For example, it is possible to achieve a configuration that causes the light transmittance of a specified portion to be reduced by operating a liquid crystal layer such as a TN mode liquid crystal layer or a guest-host mode liquid crystal layer in, for example, a passive-matrix display or a segment display. It is possible to control the light transmittance (the light-shielding percentage) by controlling electric power applied to a liquid crystal layer, and this results in being able to form light-shielding regions as illustrated in FIGS. 8A and 8B. Moreover, any configuration using liquid crystal may be adopted.

Figure 14:
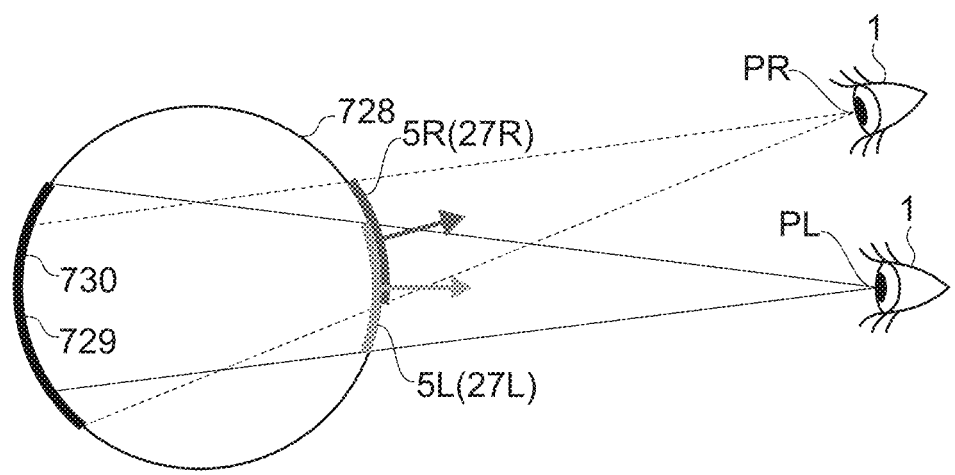
FIG. 14 is a schematic diagram describing a case of applying the present technology to display of a 3D image.
Figure 15A:
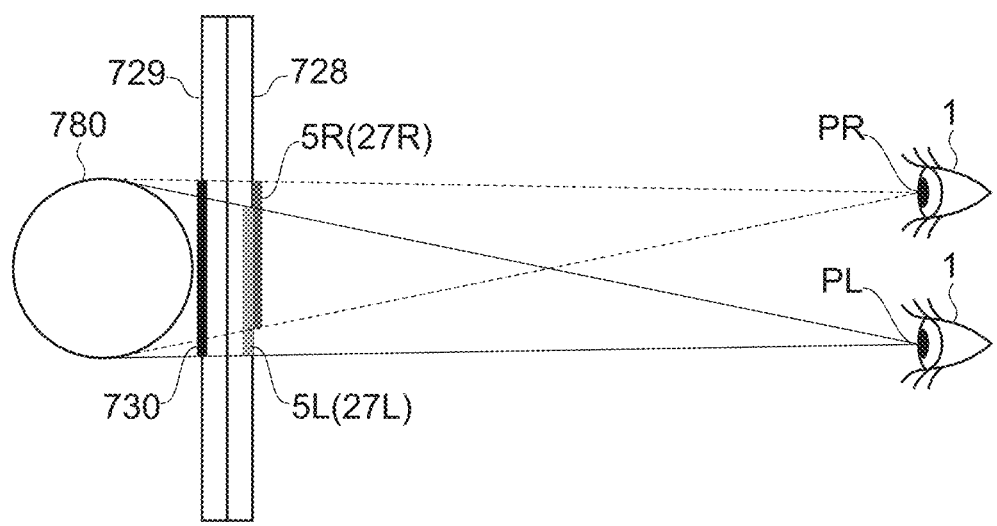
FIGS. 15A and 15B are schematic diagrams describing the case of applying the present technology to the display of the 3D image.
Figure 15B:
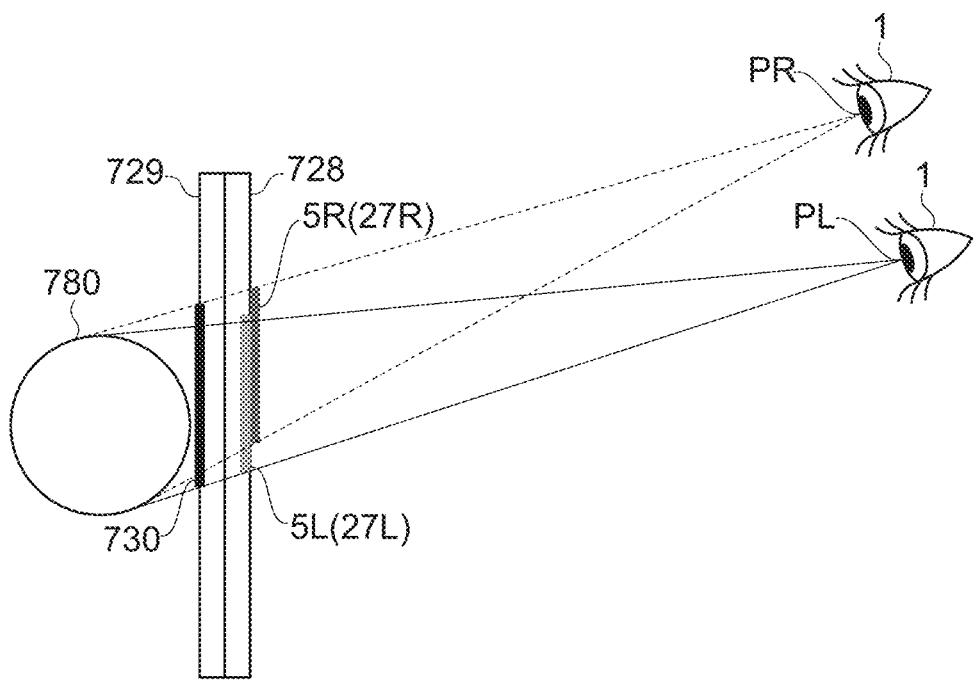
Figure 16:
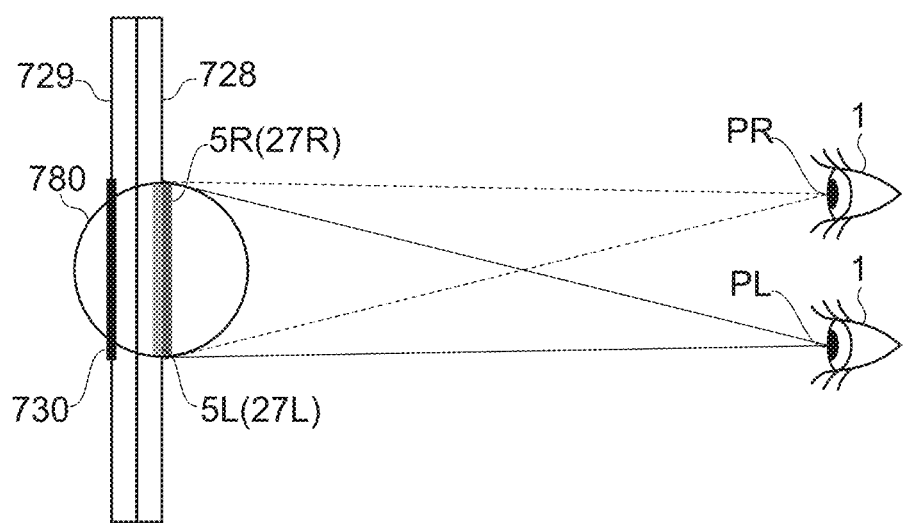
FIG. 16 is a schematic diagram describing the case of applying the present technology to the display of the 3D image.

FIGS. 14 to 16 are schematic diagrams describing a case of applying the present technology to display of a three-dimensional image (3D image). As illustrated in FIGS. 14 and 15, a left-eye image 5L used to create a 3D image is displayed on a display surface 728 according to a point-of-sight position PL of the left eye of the user 1. Further, a right-eye image 5R used to create the 3D image is displayed on the display surface 728 according to a point-of-sight position PR of the right eye of the user 1.

Further, a light-shielding region 730 is displayed on a region corresponding to a display region 27L of the left-eye image 5L and a region corresponding to a display region 27R of the right-eye image 5R. This makes it possible to view a 3D image having a high level of visibility as well as exhibiting a favorable contrast and color reproductivity.

Furthermore, as illustrated in FIG. 15B, the displays of the left-eye image 5L and the right-eye image 5R are controlled following the movements of the point-of-sight positions P1 and P2. Further, the position or the like of the light-shielding region 730 is also controlled following the movements of the point-of-sight positions P1 and P2. Accordingly, even when viewing is performed from any direction in a viewing range, it is possible to obtain a natural motion parallax, and thus to view a 3D image exhibiting a favorable contrast and color reproductivity.

Note that the position of a 3D image as viewed from the user 1 is schematically illustrated using a circle 780 illustrated in FIGS. 15A and 15B. In the examples illustrated in FIGS. 15A and 15B, it looks like a 3D display object is situated behind (on the rear side of) a light-shielding surface 729 on which the light-shielding region 730 is formed.

In the example illustrated in FIGS. 14, 15A and 15B, an edge or the like of the light-shielding region 730 that is formed in a region corresponding to the left-eye image 5L may come into the field of view of the right eye. Likewise, an edge or the like of the light-shielding region 730 that is formed in a region corresponding to the right-eye image 5R may come into the field of view of the left eye. In these cases, it is possible to view a 3D image itself with a favorable contrast, but it is difficult to deny the possibility that a portion around a 3D image will become slightly dark. However, as described with reference to FIGS. 8A and 8B, it is possible to sufficiently suppress such an impact by controlling the light transmittance (the light-shielding percentage), for example, around the edge of the light-shielding region 730.

Further, as illustrated in FIG. 16, it is also possible to display the left-eye image 5L and the right-eye image 5R such that the position of the display region 27L of the left-eye image 5L and the position of the display region 27R of the right-eye image 5R substantially coincide with each other. In this case, a region corresponding to the display region 27L of the left-eye image 5L and a region corresponding to the display region 27R of the right-eye image 5R are substantially the same region. The formation of the light-shielding region 730 in substantially the same region makes it possible to sufficiently prevent the occurrence of a problem in which an edge or the like of the light-shielding region 730 comes into the field of view of the right eye or the left eye. Note that, as illustrated using the circle 780 of FIG. 16, it looks like the 3D display object is situated at substantially the same position as the position at which the display surface 728 is situated.

A plurality of images viewed by a plurality of users may be displayed on a display surface, and a light-shielding region may be formed in a region corresponding to a display region of each of the plurality of images. This enables a plurality of users to view images having a high level of visibility. Further, as illustrated with reference to FIG. 16, when display regions of a plurality of images are substantially the same region, it is possible to sufficiently prevent a light-shielding region formed for a user from interrupting viewing of an image performed by another user.

Information other than a point-of-sight position may be used as eye information regarding an eye of a user. For example, the display of an image and the formation of a light-shielding layer may be performed according to, for example, information regarding a line-of-sight direction and a gaze point.

The region corresponding to a display region of a display image, that is, the region in which a light-shielding layer is formed is not limited to a region having a shape substantially analogous to the shape of the image. In other words, the formation of a light-shielding layer is not limited to a case in which the light-shielding layer is formed in a region overlapping an image. For example, a rectangular light-shielding region depending on the angle of view of a projector may be formed. There is a possibility that the light-shielding region will be beyond the image, but it is possible to suppress an impact on viewing of the image by controlling the light transmittance of the edge or the like of the light-shielding region.

A plurality of images may be arranged on a display surface to be spaced from one another. Also in this case, light-shielding regions are respectively formed in a plurality of regions respectively corresponding to display regions of the plurality of images. This makes it possible to display an image having a high level of visibility. Further, the light transmittance of a light-shielding region may be controlled depending on the color or the contrast of a display image.

In the present disclosure, examples of the image include both a still image and a moving image. Even when a moving image is displayed, it is possible to improve the contrast and the color reproductivity by forming a light-shielding region quickly.

At least two of the features of the present technology described above can also be combined. In other words, various features described in the respective embodiments may be optionally combined regardless of the embodiments. Further, the various effects described above are not limitative but are merely illustrative, and other effects may be provided.

Note that the present technology may also take the following configurations.

(1) An image display apparatus including:
  a display surface having transparency;
  an image display section that displays a display image on the display surface;
  an acquisition section that acquires eye information regarding an eye of a user; and
  a light-shielding section that forms, according to the acquired eye information and information regarding the display image, a light-shielding region in a region corresponding to a display region of the display image.

(2) The image display apparatus according to (1), in which
  the light-shielding section includes a light-shielding surface that is arranged on a side opposite to a side of the eye of the user with respect to the display surface and is capable of controlling light transmittance.

(3) The image display apparatus according to (1) or (2), in which
  the light-shielding section includes a light-shielding surface that is capable of controlling light transmittance, and forms a light-shielding region having a shape substantially analogous to a shape of the display image.

(4) The image display apparatus according to any one of (1) to (3), in which
  the light-shielding section includes a light-shielding surface that is capable of controlling light transmittance, and forms the light-shielding region in a region that is formed by projecting an edge of the display image onto the light-shielding surface from a position of the eye of the user.

(5) The image display apparatus according to any one of (2) to (4), in which
  the display surface is a surface of a transparent screen, and
  the light-shielding surface is a surface of a light-shielding layer arranged to be spaced from the transparent screen.

(6) The image display apparatus according to any one of (2) to (4), in which
  the display surface is a surface of a transparent screen, and
  the light-shielding surface is a surface of a light-shielding layer arranged on the transparent screen in a layered formation.

(7) The image display apparatus according to any one of (2) to (4), in which
  the display surface is a surface of a transparent screen provided as a portion of a cylindrical shape, and
  the light-shielding surface is a surface of a light-shielding layer provided as another portion of the cylindrical shape.

(8) The image display apparatus according to any one of (2) to (4), in which
  the display surface is a surface of a transparent screen provided in a cylindrical shape, and
  the light-shielding surface is a surface of a light-shielding layer arranged on an inner peripheral side of the display surface in a layered formation.

(9) The image display apparatus according to any one of (2) to (4), in which
  the image display section includes an image emission section that emits image light making up the display image,
  the display surface is a reflective surface of a reflective member that has transparency and is arranged on an emission side of the image emission section, the reflective surface being a reflective surface off which at least a portion of the image light is reflected, and
  the light-shielding surface is arranged on a side opposite to a side of the eye of the user with respect to the reflective member.

(10) The image display apparatus according to any one of (1) to (9), in which
  the light-shielding section includes
    a light-shielding surface that is capable of controlling light transmittance according to irradiation of light of a specified wavelength, and
    an emission section that emits the light of the specified wavelength.

(11) The image display apparatus according to any one of (1) to (9), in which
  the light-shielding section includes
    a light-shielding surface that is capable of controlling light transmittance according to a change in temperature, and
    a temperature control section that controls a temperature of the light-shielding surface.

(12) The image display apparatus according to any one of (1) to (9), in which
  the light-shielding section includes a liquid crystal layer that is capable of controlling light transmittance.

(13) The image display apparatus according to any one of (1) to (12), in which
  the light-shielding section increases light transmittance around an edge of the light-shielding region in a direction outward from the light-shielding region.

(14) The image display apparatus according to (10), in which
  the display surface is configured such that the light of the specified wavelength is able to be transmitted through the display surface.

(15) The image display apparatus according to (10) or (14), in which
the image display section includes an image emission section that emits image light making up the display image, and
the image emission section is capable of emitting the light of the specified wavelength and also serves as the light-shielding section.
(16) The image display apparatus according to any one of (1) to (15), in which
the image display section individually displays, on the display surface, a left-eye image and a right-eye image that are used to create a three-dimensional image, and
the light-shielding section forms the light-shielding region in a region corresponding to a display region of the left-eye image, and the light-shielding region in a region corresponding to a display region of the right-eye image.
(17) The image display apparatus according to (16), in which
the image display section displays each of the left-eye image and the right-eye image such that a position of the display region of the left-eye image and a position of the display region of the right-eye image substantially coincide with each other.
(18) The image display apparatus according to any one of (1) to (17), in which
the display surface is a surface of a hologram screen.
(19) The image display apparatus according to any one of (1) to (18), in which
the image display section displays the display image according to the acquired eye information.
(20) The image display apparatus according to any one of (1) to (19), in which
the acquisition section includes
an image-capturing section, and
an image analyzer that generates the eye information according to an image of the user that is captured using the image-capturing section.

REFERENCE SIGNS LIST

L1 image light
L2 UV light
P, P1, P2 point-of-sight position
5 image
5L left-eye image
5R right-eye image
5m edge of image
11, 411, 511 projector
12, 412, 512, 612 UV projector
13, 413, 513, 613 detection camera
17 image analyzer
18 display control section
19 light-shielding control section
20, 220, 320 cylindrical surface
25, 225, 325, 425, 525 transparent screen
26, 226, 326, 426, 526, 626 light-shielding layer
27, 27L, 27R display region
28, 228, 328, 428, 528, 628, 728 display surface
29, 229, 329, 429, 529, 629, 729 light-shielding surface
30, 30a, 30b, 230, 330, 430, 530, 630, 730 light-shielding region
100, 200, 300, 400, 500, 500a, 600 image display apparatus
211, 311, 515 integrated projector
611 viewing display
638 half mirror

The invention claimed is:
1. An image display apparatus, comprising:
a transparent display surface;
a light-shielding surface; and
circuitry configured to:
control display of a display image on the transparent display surface;
acquire eye information associated with an eye of a user; and
form, based on the acquired eye information and information associated with the display image, a light-shielding region in a region, on the light-shielding surface, where an edge of the display image is projected from a position of the eye of the user.
2. The image display apparatus according to claim 1, wherein
the light-shielding surface is arranged on a first side of the image display apparatus opposite to a second side at which the transparent display surface is present,
a proximity of the transparent display surface from the eye of the user is less than a proximity of the light-shielding surface, and
the circuitry is further configured to control light transmittance of the light-shielding surface.
3. The image display apparatus according to claim 1, wherein
the light-shielding region has a shape substantially analogous to a shape of the display image.
4. The image display apparatus according to claim 1, wherein
the transparent display surface is a surface of a transparent screen, and
the light-shielding surface is a surface of a light-shielding layer arranged to be spaced from the transparent screen.
5. The image display apparatus according to claim 1, wherein
the transparent display surface is a surface of a transparent screen, and
the light-shielding surface is a surface of a light-shielding layer arranged on the transparent screen in a layered formation.
6. The image display apparatus according to claim 1, wherein
the transparent display surface is a surface of a transparent screen provided as a first portion of a cylindrical shape, and
the light-shielding surface is a surface of a light-shielding layer provided as a second portion of the cylindrical shape.
7. The image display apparatus according to claim 1, wherein
the transparent display surface is a surface of a transparent screen provided in a cylindrical shape, and
the light-shielding surface is a surface of a light-shielding layer arranged on an inner peripheral side of the transparent display surface in a layered formation.
8. The image display apparatus according to claim 1, further comprising a projector configured to emit image light to generate the display image,
wherein
the transparent display surface is a reflective surface of a reflective member that has transparency,
the transparent display surface is arranged on an emission side, from which the image light is emitted, of the image display apparatus, and
the reflective surface reflects at least a portion of the image light.

9. The image display apparatus according to claim 1, wherein the circuitry is further configured to:
control light transmittance of the light-shielding surface based on irradiation of image light of a specified wavelength; and
control emission of the image light of the specified wavelength.

10. The image display apparatus according to claim 9, wherein the transparent display surface is configured to allow the image light of the specified wavelength to pass through the transparent display surface.

11. The image display apparatus according to claim 9, further comprising a projector configured to emit the image light to generate the display image,
wherein the circuitry is further configured to control the projector to emit the image light of the specified wavelength.

12. The image display apparatus according to claim 1, wherein
the circuitry is further configured to: control a temperature of the light-shielding surface; and
control light transmittance of the light-shielding surface based on a change in the temperature.

13. The image display apparatus according to claim 1, wherein the light-shielding surface includes a liquid crystal layer configured to control light transmittance of the light-shielding surface.

14. The image display apparatus according to claim 1, wherein the circuitry is further configured to increase light transmittance of the light-shielding surface around an edge of the light-shielding region in a direction outward from the light-shielding region.

15. The image display apparatus according to claim 1, wherein the circuitry is further configured to:
control the transparent display surface to individually display, on the transparent display surface, a left-eye image and a right-eye image to create a three-dimensional image,
form the light-shielding region in a region corresponding to a display region of the left-eye image, and
form the light-shielding region in a region corresponding to a display region of the right-eye image.

16. The image display apparatus according to claim 15, wherein
the circuitry is further configured to control the transparent display surface to display each of the left-eye image and the right-eye image such that a position of the display region of the left-eye image and a position of the display region of the right-eye image substantially coincide with each other.

17. The image display apparatus according to claim 1, wherein the transparent display surface is a surface of a hologram screen.

18. The image display apparatus according to claim 1, wherein
the circuitry is further configured to control the transparent display surface to display the display image based on the acquired eye information.

19. The image display apparatus according to claim 1, further comprising a camera to capture an image of the user,
wherein the circuitry is further configured to generate the eye information based on the captured image of the user.

* * * * *